US011209142B2

United States Patent
Hintermann et al.

(10) Patent No.: US 11,209,142 B2
(45) Date of Patent: Dec. 28, 2021

(54) DAYLIGHTING ILLUMINATION SYSTEM

(71) Applicant: BASF SE, Ludwigshafen am Rhein (DE)

(72) Inventors: Tobias Hintermann, Therwil (CH); Patrice Bujard, Basel (CH); Andre Kostro, Basel (CH); Adrian Von Muehlenen, Münster (DE); Cristobal Garrido Segura, Ludwigshafen am Rhein (DE)

(73) Assignee: Skynative UG, Basel (CH)

( * ) Notice: Subject to any disclaimer, the term of this patent is extended or adjusted under 35 U.S.C. 154(b) by 0 days.

(21) Appl. No.: 16/897,573

(22) Filed: Jun. 10, 2020

(65) Prior Publication Data

US 2020/0378572 A1  Dec. 3, 2020

Related U.S. Application Data

(63) Continuation of application No. 16/346,601, filed as application No. PCT/IB2017/056806 on Nov. 2, 2017, now Pat. No. 10,718,479.

(30) Foreign Application Priority Data

Nov. 3, 2016 (EP) .................................... 16197138
Apr. 7, 2017 (EP) .................................... 17165476
Aug. 7, 2017 (EP) .................................... 17185166

(51) Int. Cl.
*F21S 11/00* (2006.01)
*F21V 8/00* (2006.01)
(Continued)

(52) U.S. Cl.
CPC ............... *F21S 11/002* (2013.01); *E04C 1/42* (2013.01); *E04C 2/54* (2013.01); *E04D 3/06* (2013.01);
(Continued)

(58) Field of Classification Search
CPC .... F21S 11/00; E04C 1/42; E04C 2/54; E04D 3/06; E04D 13/033
(Continued)

(56) References Cited

U.S. PATENT DOCUMENTS 4,379,613 A   4/1983 Coburn
4,389,085 A * 6/1983 Mori ........................ F21S 11/00
                                                        359/591

(Continued)

FOREIGN PATENT DOCUMENTS

CN    101680631 A    3/2010
CN    101946333 A    1/2011
(Continued)

OTHER PUBLICATIONS

Garcia, H., et al., "Natural illumination of deep-plan office buildings : lightpipe strategies", ISES Solar World Congress, Goteborg, Sweden, 2003, pp. 1-8. (Year: 2003).*

(Continued)

*Primary Examiner* — Clayton E. LaBalle
*Assistant Examiner* — Kevin C Butler
(74) *Attorney, Agent, or Firm* — Faegre Drinker Biddle & Reath LLP

(57) ABSTRACT

A daylight illumination system for integration into a building or larger vehicle comprises a translucent facade element (800) containing a glass sheet and a light redirection element (302 or 708), and a light transport channel (801) for guiding light about horizontally into an interior of the building, the light transport channel comprising one opening attached to the interior side of said facade element and at least one opening towards the interior of the building, characterised in that the light redirection element (302 or 708) is formed as a structured polymer film or sheet attached to a glass sheet of the facade element (800) and is configured for changing (Continued)

the direction of incident light into the about horizontal light transport channel.

17 Claims, 10 Drawing Sheets

(51) Int. Cl.
  *E04C 1/42* (2006.01)
  *E04D 13/03* (2006.01)
  *E04C 2/54* (2006.01)
  *E04D 3/06* (2006.01)
(52) U.S. Cl.
  CPC ............ *E04D 13/033* (2013.01); *F21S 11/00* (2013.01); *F21S 11/007* (2013.01); *G02B 6/005* (2013.01); *G02B 6/0028* (2013.01); *G02B 6/0055* (2013.01); *G02B 6/0056* (2013.01); *G02B 6/0066* (2013.01); *G02B 6/0095* (2013.01); *G02B 6/0045* (2013.01)
(58) Field of Classification Search
  USPC .......................................................... 359/593
  See application file for complete search history.

(56) References Cited

U.S. PATENT DOCUMENTS

| | | | | |
|---|---|---|---|---|
| 5,581,447 A * | 12/1996 | Raasakka | .................. | F21V 9/04 362/557 |
| 5,709,456 A * | 1/1998 | Smith | ....................... | F21S 11/00 136/259 |
| 5,877,874 A | 3/1999 | Rosenberg | | |
| 6,059,438 A * | 5/2000 | Smith | ....................... | F21S 11/00 362/147 |
| 6,084,231 A * | 7/2000 | Popat | ........................ | E06B 9/32 250/2 UAL |
| 6,201,643 B1 * | 3/2001 | Carlson | .................... | F21S 11/00 359/591 |
| 6,341,041 B1 * | 1/2002 | Carlson | .................... | F21S 11/00 359/591 |
| 7,873,257 B2 * | 1/2011 | Morgan | ............. | G02B 19/0019 385/146 |
| 8,955,269 B2 * | 2/2015 | Rillie | ....................... | F21S 11/00 52/200 |
| 8,958,157 B2 * | 2/2015 | Rillie | ...................... | F21S 11/007 359/593 |
| 9,229,144 B2 * | 1/2016 | Ghosh | .................... | F24S 23/12 |
| 9,246,038 B2 * | 1/2016 | Moore | ................ | H01L 31/0547 |
| 10,718,479 B2 | 7/2020 | Hintermann et al. | | |
| 2002/0159154 A1 * | 10/2002 | Milner | ...................... | E06B 9/24 359/613 |
| 2009/0126792 A1 | 5/2009 | Gruhlke et al. | | |
| 2009/0199893 A1 * | 8/2009 | Bita | .................... | H01L 31/0543 136/248 |
| 2009/0262427 A1 * | 10/2009 | Whang | ................... | F21S 11/00 359/593 |
| 2010/0037954 A1 * | 2/2010 | Thony | ................ | H01L 31/0547 136/259 |
| 2010/0172147 A1 * | 7/2010 | Whang | .................. | F24S 23/10 362/551 |
| 2012/0006382 A1 | 1/2012 | Dagli et al. | | |
| 2012/0120496 A1 * | 5/2012 | Thuot | .................... | G02B 27/00 359/596 |
| 2012/0141068 A1 * | 6/2012 | Nyhart, Jr. | ........... | G02B 6/0028 385/39 |
| 2012/0230020 A1 * | 9/2012 | Rillie | .................... | F21V 7/0025 362/147 |
| 2013/0135744 A1 * | 5/2013 | Jaster | .................... | G02B 17/00 359/597 |
| 2014/0133030 A1 * | 5/2014 | Gardiner | .............. | G02B 17/006 359/592 |
| 2014/0160570 A1 * | 6/2014 | Jaster | ....................... | F21S 11/00 359/597 |
| 2014/0299121 A1 | 10/2014 | Taber, Jr. | | |
| 2015/0022895 A1 | 1/2015 | Gommans | | |
| 2016/0178879 A1 * | 6/2016 | Ford | ........................ | G02B 6/26 250/203.4 |
| 2016/0276514 A1 * | 9/2016 | Simavoryan | ......... | G03H 1/0408 |
| 2017/0009947 A1 * | 1/2017 | Jaster | .................... | F21S 11/002 |
| 2017/0023197 A1 | 1/2017 | Ueki et al. | | |
| 2017/0130920 A1 * | 5/2017 | Tsujimoto | ................ | E06B 5/00 |
| 2017/0307789 A1 * | 10/2017 | Nirmal | ................. | G02B 5/0231 |
| 2017/0363789 A1 | 12/2017 | Stalder et al. | | |
| 2018/0313141 A1 * | 11/2018 | Nishinaka | ................ | F21V 3/00 |

FOREIGN PATENT DOCUMENTS

| | | |
|---|---|---|
| CN | 102305380 A | 1/2012 |
| CN | 203162829 U | 8/2013 |
| DE | 3522717 A1 | 10/1986 |
| DE | 3604269 A1 | 8/1987 |
| EP | 1306606 A1 | 5/2003 |
| EP | 2061092 A1 | 5/2009 |
| JP | 2003-215348 A | 7/2003 |
| JP | 2014-209423 A | 11/2014 |
| JP | 2014-209424 A | 11/2014 |
| JP | 2016-048618 A | 4/2016 |
| KR | 10-2003-0000943 A | 1/2003 |
| KR | 10-0384277 B1 | 5/2003 |
| KR | 10-2013-0099550 A | 9/2013 |
| TW | 201631081 A | 8/2016 |
| WO | 98/28645 A1 | 7/1998 |
| WO | 2009/035986 A2 | 3/2009 |
| WO | 2011/022274 A1 | 2/2011 |
| WO | 2012/144268 A1 | 10/2012 |
| WO | 2012/176126 A1 | 12/2012 |
| WO | 2014/024146 A1 | 2/2014 |
| WO | 2014/070495 A1 | 5/2014 |
| WO | 2014/070498 A1 | 5/2014 |
| WO | 2015/098209 A1 | 7/2015 |
| WO | 2015/156225 A1 | 10/2015 |
| WO | 2016/064669 A1 | 4/2016 |

OTHER PUBLICATIONS

European Search Report for EP Patent Application No. 16197138.7, dated Mar. 14, 2017, 3 pages.
European Search Report for EP Patent Application No. 17165476.7, dated Nov. 24, 2017, 3 pages.
European Search Report for EP Patent Application No. 17868297.7, dated May 28, 2020, 3 pages.
Garcia, H., et al., , "Natural illumination of deep-plan office buildings : light pipe strategies", ISES Solar World Congress, Goteborg, Sweden, 2003, pp. 1-8.
International Preliminary Reporton Patentability received for PCT Patent Application No. PCT/IB2017/056806, dated May 16, 2019, 8 pages.
International Search Report for PCT/IB2017/056806 dated Feb. 22, 2018.
International Search Report for PCT/IB2017/056813 dated Feb. 23, 2018.
Molini, D., et al., "ADASY (Active Daylighting System)", Optical Modeling and Measurements for Solar Energy Systems III, 2009, vol. 7410, pp. 1-8.
U.S. Appl. No. 16/346,606, filed May 1, 2019.
Written Opinion of the International Searching Authority for PCT/IB2017/056806 dated Feb. 22, 2018.
Written Opinion of the International Searching Authority for PCT/IB2017/056813 dated Feb. 23, 2018.

* cited by examiner

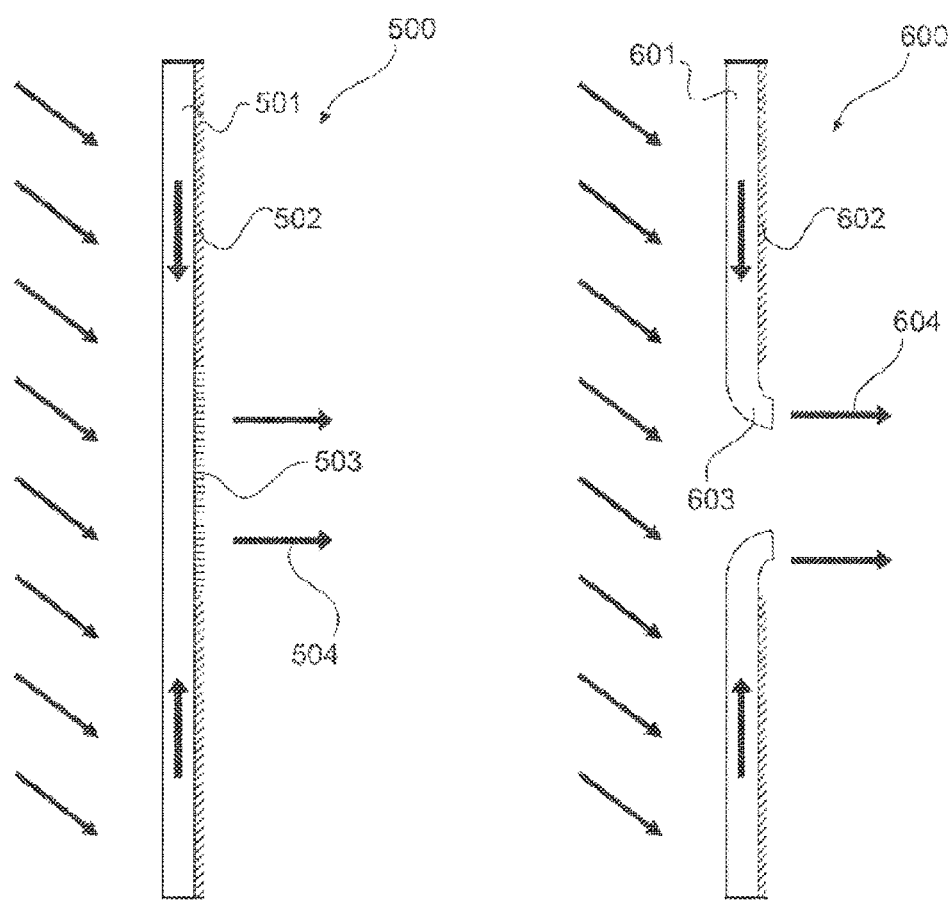

(a)  (b)

DAYLIGHTING ILLUMINATION SYSTEM

This Application is a Continuation of application Ser. No. 16/346,601 filed on May 1, 2019. Application Ser. No. 16/346,601 claims priority from Application 17185166.0 filed on Aug. 7, 2017 in European Patent Office. Application Ser. No. 16/346,601 claims priority from Application 17165476.7 filed on Apr. 7, 2017 in European Patent Office. Application Ser. No. 16/346,601 claims priority from Application 16197138.7 filed on Nov. 3, 2016 in European Patent Office. The entire contents of these applications are incorporated herein by reference in their entirety.

FIELD OF THE INVENTION

The present invention relates to daylight illumination of interior rooms with insufficient daylight, typically in buildings. In particular, it relates to a mirrored light transportation channel suitable for horizontal mounting under the ceiling, whose front end is sealed to the interior side of the building's façade and comprises a structured polymer film or sheet functioning as a light redirection element and/or light collector. The transportation channel's other end extends into the interior of the building; its side wall, especially the side wall facing the floor, comprises one or more openings equipped with luminaires. The invention further relates to a daylight illumination system comprising such components, and to a building with such daylight illumination system.

BACKGROUND OF THE INVENTION

The long-distance transport of visible light through a building can use large mirror-lined ducts, or smaller solid light guides which exploit total internal reflection. Mirror-lined ducts include advantages of large cross-sectional area and large numerical aperture (enabling larger fluxes with less concentration), a robust and clear propagation medium (i.e., air) that leads to both lower attenuation and longer lifetimes, and a potentially lower weight per unit of light flux transported. Solid light guides include the advantage of configuration flexibility, which can result in relatively tight bends with low light loss. While the advantages of mirror-lined ducts may appear overwhelming, solid light guides are nevertheless frequently selected because of the practical value of assembling light conduits in much the same fashion as plumbing. Regardless of the technique used to transport light effectively, a practical and efficient daylight collector that is adapted to the transport system is needed.

Fiber optics based daylighting systems collecting light outside a building and transporting it over long distance through optical fiber cables to the interior have been described e.g. in U.S. Pat. Nos. 4,389,085 and 5,581,447. These systems can collect and concentrate large quantities of direct sunlight with a high concentration factor for coupling into a fiber optic cable. Their sun acceptance angle is however very small and they need thus bi-axially sun tracking mechanic devices which are expensive to produce, require intense maintenance in use, and are very bulky which makes integration into the facade of a building extremely challenging.

In DE 3604269, U.S. Pat. Nos. 5,709,456, and 6,059,438 a fiber optic system that uses a static (non sun-tracking) collector based on light absorbing and re-emitting dyes is proposed. Such a system can be flat and thus easily integrated into the facade or the roof of a building. It suffers however under very low optical collection efficiency, a low light concentration factor, and a non-natural light spectrum.

US patent application US 2010/0172147 describes another type of fiber optic system consisting of a static collector with macroscopic prism array modules to collect light and coupling it into a solid light pipe for transport into a building. Patent application WO 2015/098209 describes yet another fiber optic system based on a flat multilayer micro-optic prism film collector design. DE 3522717 describes a fiber optic system with a flat lens based static concentrator element.

All these static collector systems are flat and can in principle easily be integrated into the facade of a building or its roof. They do however not allow a high light concentration factor and a large amount of optical fiber (light pipe) is thus required to transport the light over long distances into the building, which makes the systems extremely expensive and heavy.

Daylighting systems based on mirror lined duct light transport elements are well known. Vertical light tubes for light transport from the roof to the upper floors of a building are described e.g. in U.S. Pat. No. 8,955,269, WO 2011/022274, US 2014/0160570, or EP 1306606. Systems of this class are of only minor interest for multistory office buildings, where distances from the roof to the offices are mostly too long to provide the required light intensity of 500 lx in the central working region (DIN EN 12464-1, office illumination). They are thus limited in their light transport distance to about 5 m or do require a very large cross-section area for transport of light over longer distances, thus occupying a large proportion of the available building volume. For higher light collection efficiency, the systems often comprise a dome covering the light transport duct which may comprise additional optical structures such as Fresnel structures or laser cut panels (LCP). The cover is thus bulky and does make integration of the system into the building envelope challenging.

Horizontal light tubes for building illumination with daylight from the facade have been suggested in CN 102305380 and WO 1998/028645, a system combined with laser cut panels as collector (LCP) was described by V. Garcia Hansen and I. Edmonds in 'Natural illumination of deep-plan office buildings: light pipe strategies. In: ISES Solar World Congress 2003, 14-19 Jun. 2003, Göteborg, Sweden' and CN203162829, and another system with CPC type collector elements is described by D. Váquez-Moliní et al. (ADASY, Active Daylighting System: Proc. of SPIE Vol. 7410, 74100H). All these systems do either not allow to collect daylight from an area larger than the cross-section of the mirror lined duct and/or do have bulky extensions protruding from the facade of the building. This makes architectural integration challenging and/or requires presence of expensive optical elements.

A horizontal light tube system with a daylight collector element that allows collecting light from a substantially larger area then the cross-section of the mirror lined duct is proposed in KR 100384277. The collector comprises a condensing portion formed by a frame and a Fresnel lens, and a light change portion formed by two prism lenses. The second prism lens is optically connected to a mirror lined duct. The collector device of this system is however very bulky and can thus not be easily integrated into the facade or roof of a building.

A daylighting system combining a protruding flat collector element comprising macro-optical and mirror structures with a mirror lined duct is proposed in JP 2014/209423 and JP 2014/209424 and JP 2016/048618.

All state of the art daylighting systems described above have the disadvantage of low solar acceptance angle resulting in the need for expensive mechanical tracking systems, and/or need for expensive optical fiber cables for transport of daylight over long distances, and/or bulky collector elements making integration into the building envelope a challenge, and/or need for expensive optical elements, and/or limited optical efficiency. Where used to introduce light from the side of the façade, such devices not only introduce aesthetical breaks into the facade, but also interrupt the building envelope and its thermal shielding.

SUMMARY OF THE INVENTION

There is thus a need in the art for a daylighting system with a static collector and/or redirecting element that does not require protruding parts and thus can be easily integrated in the building envelope, retaining its thermal insulation properties, and does not require expensive optical elements for light collection and light transport.

It has been found by the inventors of the present invention that the combination of a translucent glass facade element comprising a light collection and/or redirection film or sheet, which is configured for coupling sun light into a mirror-lined duct surprisingly results in much improved system performance. Details about such beneficial daylighting systems will become apparent from the following explanations.

The invention thus generally pertains to a daylight illumination system for integration into a building, the daylight illumination system comprising
a translucent facade element (800) containing a glass sheet and a light redirection element (302 or 708), and a light transport channel (801) for guiding light about horizontally into an interior of the building, the light transport channel comprising one front opening attached to the interior side of said facade element and at least one opening towards the interior of the building, characterised in that
the light redirection element (302 or 708) is formed as a structured polymer film or sheet attached to a glass sheet of the facade element (800) and is configured for changing the direction of incident light into the about horizontal light transport channel. The glass sheet may carry the present light redirecting element directly on its glass surface, typically with an adhesive, or the glass sheet may be coated as explained further below and carry said element on its coated surface.

The object of the present invention is solved by the subject-matter of the independent claims. Further embodiments and advantages of the invention are incorporated in the dependent claims.

DETAILED DESCRIPTION OF EMBODIMENTS

The described embodiments similarly pertain to the light collector for use in a daylight illumination system, to the daylight illumination system for integration into a building and to the building. Synergetic effects may arise from different combinations of the embodiments although they might not be described in detail.

Where an indefinite or definite article is used when referring to a singular noun, e.g. "a", "an" or "the", this includes a plurality of that noun unless something else is specifically stated. The terms "about" or "approximately" in the context of the present invention denote an interval of accuracy that the person skilled in the art will understand to still ensure the technical effect of the feature in question. The term typically indicates deviation from the indicated numerical value of ±20%, preferably ±15%, more preferably ±10%, and even more preferably ±5%. The term "about" is synonymous to "essentially" and denotes a possible deviation from the basic value as noted above, except in case of angles, where the term "about" denotes a possible deviation by plus or minus 10 degrees (preferably up to plus or minus 5 degrees). Thus, the term "about horizontal" denotes an alignment (e.g. of the light transport channel) with a maximal inclination of plus or minus 10 degrees, and preferably plus or minus 5 degrees, from the horizontal.

Technical terms are used by their common sense. If a specific meaning is conveyed to certain terms, definitions of terms will be given in the following in the context of which the terms are used. The terms "mirror lined duct", "light duct", "light transport channel", "light channel", "light tube" are used synonymously. The term "specular reflection" refers to reflection without creation of diffuse light.

Functionally as well as aesthetically, the present facade element may be integrated into the building envelope without protruding, thus preferably becoming part of the building envelope, typically as part of a smooth façade, which may be a glass facade. Thus, the facade element (with its surface typically defined by height h' and width w' as depicted in FIG. 2), along with glass sheet and the film or sheet comprising the light redirecting element attached to it (i.e. the light redirecting element being typically laminated to a glass sheet or another sheet parallel to a glass sheet), generally may be arranged parallel to the façade and/or as part of a flat (typically: vertical) facade.

In general, the present light transport channel is fitted, with its front opening, to the façade element from the inside of the building, thus preserving heat management properties of the building envelope, and the façade's aesthetical appearance. The present light transport channel may be fitted to the façade element such that its front opening (cross section) is sealed to said façade element, or the light transport channel is merely arranged behind the façade element in order to allow light entry from the façade element into its front opening, which may be sealed by a separate transparent sheet such as a polymer sheet or glass sheet.

The thickness d of the facade element typically may vary from 0.1 cm to 25 cm, preferably from 1 cm to 20 cm, more preferably from 2 cm to 15 cm. Preferably the thickness of the collector is constant over the whole area, but it may also differ in the area of the at least one center or the channel attachment section of the collector.

According to a first general embodiment of the present invention (see FIG. 1), the light redirecting element is configured to direct light, which reaches the exterior surface of the building envelope typically under a more or less steep angle of incidence, into a light transport channel. Light entering (or coupled into) the film or sheet containing this light redirecting element thus changes its direction into the desired direction, and subsequently leaves the film or sheet (i.e. is coupled out) towards the interior of the building essentially without further redirecting (except by passages through one or more optional further layers of the building envelope such as films or glass sheets, which may cause a minor diffraction; such diffraction remains extremely small since surfaces of such further layers are essentially parallel).

According to a second general embodiment of the present invention (see FIG. 2), the light redirecting element is configured to couple light, which reaches the exterior surface of the building envelope typically under a more or less steep angle of incidence, into the film or sheet, or one or more layers adjacent thereto (waveguide layer(s)), the film or sheet thereby acting as a light collector for use in a daylight illumination system and for integration into a building. The light collector comprises a waveguide layer, a light collection and redirection element which is configured for coupling sun light into the waveguide layer. The light collector also comprises an outcoupling element configured for outcoupling light from the waveguide into a light transport channel of the daylight illumination system.

In the following, sections referring to the light collector relate to this second general embodiment of the invention, while all other sections (inter alia relating to the redirecting element, the light transport channel, the façade element or the luminaires) relate to each the first and the second general embodiment of the invention.

The light transport channel (FIG. 1 or 2, foreseen for extending with its length l into the interior of the building) generally forms an angle of 45° or more with the exterior surface of the facade element (in FIG. 2 defined by its height h' and width w'); typically, the angle between the plain h'×w' and a long side of the light channel of length l is about 90°, thus realizing an about horizontal positioning.

Thus, the present daylight illumination system is not a fiber optic based system. In general, the facade element equipped with the light redirecting element is supposed to be arranged at the outside of the building exposed to daylight. As will be explained in more detail, a light collector as of the second embodiment allows for collecting light from an area that is larger than the cross-section area of the light transport channel.

The light collector of the present invention collects light in a different manner compared to the prior art and also guides the collected light in a different manner towards the light transport channel. At least one waveguide layer is used which can make use of solid and/or liquid light guides. In principle, the light impinging on the surface of the light collector is coupled by the light collection and redirection element into the waveguide, in which it is guided towards the outcoupling element via Total Internal Reflection (TIR). The one or more waveguide layers, the light collection and redirection element and the outcoupling element can be embodied in several different ways. This will be explained in more detail hereinafter in the context of different embodiments of the present invention.

In other words, the novel light collector which is configured to be used in a daylight illumination system and for being integrated into the facade of a building, is configured to couple the daylight into the solid and/or liquid waveguide layer and also to couple it out of said waveguide layer to direct the outcoupled light into a light transport channel which can be arranged at or in the light collector. The interface between the light collector and the light transport channel will be explained in more detail hereinafter. In particular, the combination of the waveguide layer as a solid light guide, and the light transport channel as a mirror-lined duct is a preferred embodiment.

The section where the outcoupling elements are located at the light collector can preferably be in the center of the light collector, as shown and explained in the context of e.g. FIGS. 2 and 3. This is because it may be preferred that the light transport channel is attached to the light collector in a central position, as indicated in FIGS. 2 and 3. But also other, non-centered attachment positions are possible. The area or section of the light collector where the light transport channel is to be attached or is attached is called channel attachment section. Hence, in the following, some features like e.g. the outcoupling elements will be described with respect to the center of the light collector or alternatively the channel attachment section, i.e. the location where the light transport channel is attached to the light collector.

The waveguide layer is preferably a solid light guide plate, but may also include a liquid light guide material. The light collector element may also comprise a laminate of a plurality of waveguide layers. The waveguide layer is preferably made of a solid material such as a polymer or glass. Preferably it is made of polymethyl methacrylate, polyacrylate, thermoplastic polyurethane, polycarbonate, polysilicone, or polycycloolefin. The at least one waveguide layer may have a constant thickness over the whole collector area or its thickness may increase from the edge towards the center or towards the area or section where the light transport channel is to be attached or is attached, i.e. the channel attachment section. There may be central areas of the light collector, where the waveguide layer is interrupted, i.e. where there are one or several openings (preferably circular or rectangular) in the at least one waveguide layer. The thickness of the waveguide layer may be from 0.1 mm to 200 mm, preferably from 0.5 mm to 100 mm, more preferably from 1 mm to 50 mm.

The waveguide layer may be a continuous layer within the light collector and which does not have interruptions or recesses or the like. In other words, from a front perspective as shown in e.g. FIG. 1, the waveguide layer may cover the entire cross-section of the light collector or substantially the entire cross-section of the light collector.

As will be explained in the context of specific embodiments later on, the waveguide layer may also have recesses, in particular in the channel attachment section of the light collector or the center of the light collector, as can be gathered for example from FIG. 3.

According to another exemplary embodiment of the present invention the light collection and/or redirection element is embodied as a plurality of grating couplers and/or holograms and/or mirrors and/or micromirrors and/or reflective microstructures. In an embodiment, a transparent microstructure is used where light is reflected by total internal reflection for specific angles and passing through for other angles.

In the context of the present invention the term micromirror shall be understood as a mirror which has dimensions on the micrometer scale, i.e. from 0.1 to 5000 micrometer or preferably from 0.5 to 2000 micrometer or more preferably from 1 to 1000 micrometer. Further, in the context of the present invention the term reflective microstructure shall be understood as a reflective structure which has dimensions on the micrometer scale, i.e. from 0.1 to 5000 micrometer or preferably from 0.5 to 2000 micrometer or more preferably from 1 to 1000 micrometer.

The light collection and/or redirection element may consist of a plurality of optical or micro-optical structures such as symmetric or asymmetric prism, pyramid, sinusoid, or cone type structures. Preferably it may consist of a plurality of linear or circular extended (micro-)optical structures, e.g. of symmetric or asymmetric V-groove type. In case of embodiment 2 of the present invention, the (micro-)optical structure may be transparent and thus redirecting light by total internal reflection (TIR), or it may be coated with a specular reflective mirror layer. In the latter case the (micro-)optical structure is located on the side of the waveguide layer directed towards the interior of the building.

The optical element for redirection of incident daylight may also be a holographic grating or a diffraction grating that is redirecting incident light towards the light channel (in case of embodiment 1 of the present invention), or coupling the light into the waveguide layer (in case of embodiment 2 of the present invention). The optical element that redirects the incident daylight is arranged in a way that light is directed and transported into the light transport channel, or in the waveguide layer towards the center of the collector or towards the channel attachment section. The light collector may have just one area, section or center towards which the daylight is redirected and transported through the waveguide layer, or it may have a plurality of areas, sections or centers towards which the daylight is redirected and transported through the waveguide layer.

Light redirecting polymer films useful in the present invention are commercially available. The light redirecting polymer film may be obtained in a process comprising a step of microstructuring a polymer surface to obtain a structured layer. The (micro-)optical structure, as a whole, typically is transparent and is embedded in a polymer sheet or film or embossed onto the surface of a polymer sheet or film, preferably of polyvinyl butyral (PVB), poly methyl methacrylate (PMMA), poly acrylate, thermoplastic poly urethane, polycarbonate (PC), poly silicone, or poly cycloolefin. The same materials are preferably used for holographic or diffracting light redirecting elements. In case the (micro-)optical structure is coated with a specular reflective mirror layer (e.g. an aluminum layer or a silver layer, or a specular reflective multilayer polymer film), the structure may in addition also be made of poly acrylate, poly olefin, poly ester and any other suitable material. When the structured layer is prepared by embossing, typically a flat film with an embossable surface is contacted to a structured tool with the application of pressure and/or heat to form an embossed surface. The entire flat film may comprise an embossable material, or the flat film may only have an embossable surface. The embossable surface may comprise a layer of a material that is different from the material of the flat film, which is to say that the flat film may have a coating of embossable material at its surface. The structure on the embossed surface is the inverse of structure on the tool surface, that is to say a protrusion on the tool surface will form a depression on the embossed surface, and a depression on the tool surface will form a protrusion on the embossed surface.

In a method of specific technical interest for preparing the redirecting structures (as also mentioned in abovesaid WO2014024146), a UV curable resin layer is applied to a polymer film (such as a PET film), structured by an imprinting process and cured by UV light. One process may be an imprinting process and, preferably, a roll-to-roll imprinting process. In a preferred embodiment, the laminate carrying the structured layer is prepared as a single construction by an UV imprinting process. In another embodiment, the coated substrate is prepared from a radiation curable (meth)acrylate material, and the molded (meth)acrylate material is cured by exposure to actinic radiation. For example, a curable polymeric material may be coated on a substrate film and pressed against a microstructured molding tool and allowed to cure e.g. by UV irradiation to form a structured layer on the substrate film. Upon removal of the molding tool, the structured layer is obtained. The structure on the imprinted surface is the inverse of structure on the tool surface, that is to say a protrusion on the tool surface will form a depression on the imprinted surface, and a depression on the tool surface will form a protrusion on the imprinted surface.

In case that a resin material curable by heat and/or radiation is used for preparing the structured layer, a UV curable resin is preferred. In this case, the binder essentially comprises monomeric or oligomeric compounds containing ethylenically unsaturated bonds, which after application are cured by actinic radiation, i.e. converted into a crosslinked, high molecular weight form. Where the system is UV-curing, it generally contains a photoinitiator as well. Corresponding systems are described in the abovementioned publication Ullmann's Encyclopedia of Industrial Chemistry, 5th Edition, Vol. A18, pages 451-453. The resin composition may further contain a stabilizer such as a sterically hindered amine.

Dual cure systems, which are cured first by heat and subsequently by UV irradiation, or vice versa, comprise components contain ethylenic double bonds capable to react on irradiation with UV light, typically in presence of a photoinitiator.

The electromagnetic radiation thus preferably is UV light, and the radiation curable coating typically is a UV curable coating. Cure of the UV curable coating (UV lacquer) during the transfer step may be accomplished in analogy to methods described in WO 12/176126. Preferred curing wavelengths are, for example, from the short wavelength range 220-300 nm, especially 240-270 nm, and/or from the long wavelength range 340-400 nm, especially 350-380 nm, as achievable e.g. by LED curing.

The so obtained structured layer may be subjected to metal vapour deposition under an oblique angle, thus producing a grating of micromirrors. The micromirrors may then be encapsulated, using the same material as in the structuring step or another material. Such encapsulation modifies the optical properties and protects the coating. The structured polymer film may be applied with an adhesive on the glass or coated glass sheet of the façade element, thus forming the present front plate. FIG. 12 shows the above described process.

The light redirecting film may also be a structured polymer film providing reflection of light at an interface between 2 transparent materials of strongly differing index of refraction (e.g. by 0.4 to 0.7) such as realized e.g. by interfaces between polymer and air as in WO 2016/064669.

The light collection and/or redirection element of the light collector can be embodied in several different ways. This optical element that redirects the incident daylight may cover the whole area of the waveguide layer or it may cover only parts of the area of the waveguide layer. If the light collector consists of a laminate of a plurality of waveguide layers, the light collection and redirection element that redirects the incident daylight may consist of a plurality of stripes or patches attached to each of the plurality of waveguide layers, the stripes or patches displaced towards each other in a way that combined they cover a large area of the light collector. The light collection and redirection element of the light collector may comprise just one type of optical element or it may comprise a combination of several types of optical elements, as described herein, in parts of the area of the waveguide layer or the whole area of the waveguide layer.

The light collection and redirection element that redirects the incident daylight may be directly attached to the at least one waveguide layer or additional elements may be comprised between the optical element and the waveguide layer. These elements may include, but are not limited to, an air gap, a low refractive index layer, a high refractive index layer, an index matching layer, a gradient index layer. The additional elements may also include adhesive layers, polymer films, glass layers, or compatibility layers.

In the context of the present invention the term "high refractive index layer" or "high refractive index material" shall be understood as a layer or material which has a refractive index which is higher than the refractive index of the waveguide layer. Further, in the context of the present invention the term "low refractive index layer" or "low refractive index material" shall be understood as a layer or material which has a refractive index which is lower than the refractive index of the waveguide layer.

Between the light collection and redirection element that redirects the incident daylight and the waveguide layer, a gradient refractive index layer may be used having a refractive index where it is in contact with the waveguide layer which is higher than the refractive index of the waveguide material. The gradient refractive index layer may be constructed such that the difference between its high refractive index n(high) and its low refractive index n(low) ranges from 0.15 to 0.4 and, preferably, from 0.18 to 0.35. For instance, in the example of FIG. 10, there is one layer of n=1.7, one layer of n=1.6 (adhesive). The gradient refractive index layer can be formed as a single layer or as a sequence of a multitude (two or more) of layers with differing refractive index in the form of a step gradient index layer. However, in general, the refractive index of the gradient refractive index layer decreases from the part of the layer which is in contact with the light collection and redirection element towards the part of the layer which is in contact with the waveguide layer. This decrease can be step wise and/or continuously in the sense of a continuous gradient. In a preferred embodiment, the part of the gradient refractive index layer with the highest refraction index entirely covers and is in contact with the light collection and redirection element.

The light collector may additionally comprise lenses on the side of the at least one waveguide layer directed away from the building towards the sun. These lenses may focus the incident daylight onto the optical element that redirects the incident daylight and couples it into the at least one waveguide layer, where it is transported by total internal reflection (TIR) towards e.g, the center of the collector or in general towards the channel attachment section. The lenses may be macro- or micro-lenses or Fresnel lenses, preferably micro-lenses or Fresnel lenses. The lenses may be made of glass, poly silicon, poly acrylate, poly carbonate, poly methyl methacrylate, poly cyclo-olefin or any other suitable material.

Between the lenses and the light collection and redirection element that redirects the incident daylight additional elements can be comprised. These elements may include, but are not limited to, an air gap, a low refractive index layer, a high refractive index layer, a gradient index layer. The additional elements may also include adhesive layers, polymer films, glass layers, or compatibility layers. The lenses may allow to increase the dimensions of the collector over which the light can be collected with high efficiency.

In a particular embodiment of the invention, the light collection and redirection element that redirects the incident daylight and couples it into the at least one waveguide layer are based on flat light collector technology such as for instance (but not limiting) described in WO 2015/098209, or WO 2009/035986, or U.S. Pat. No. 9,229,144, or U.S. Pat. No. 9,246,038, or US 2016/178879, or US 2016/276514. Any other light collection technology that fulfills the requirement of a flat collector as specified herein may however be employed for redirecting and coupling into the waveguide layer.

In accordance with the first embodiment of present invention, no optical element that redirects the incident daylight and couples it into the at least one waveguide layer is attached to the area of the at least one center of the light collector/or the channel attachment section. Instead, outcoupling elements which couple light out of the waveguide layer towards the interior of the building, thus forming the present redirecting element, are attached to the film or sheet layer in at least parts of the center of the facade element or the location where the light transport channel is attached to it.

According to another exemplary embodiment of the present invention the outcoupling element or redirecting element is chosen from the group comprising flat mirror containing elements, parabolic mirror containing elements, elements containing optical light extraction structures at the surface such as e.g. prisms, pyramids, cones, or any combination thereof, or wherein the outcoupling element is provided by bending the waveguide layer to redirect the light by total internal reflection within the waveguide layer.

Outcoupling elements, i.e. optical elements which couple the light out of the waveguide layer, e.g. towards the interior of the building, may for instance be, but are not limited to: flat mirror containing elements, parabolic mirror containing elements, elements containing optical light extraction structures at the surface such as e.g. prisms, pyramids, cones, or the element may be formed by bending the waveguide layer towards the interior of the building to redirect the light by total internal reflection (TIR) within the waveguide layer.

Mirror elements may be either applied in the area of the center of the collector (or the channel attachment section) once across the whole cross-section of the waveguide layer, or repeatedly in only parts of the cross-section of the waveguide layer, e.g. close to the surface of the waveguide layer. The mirror elements may be fabricated by injection molding and attached to the waveguide layer or may be directly engraved into the waveguide layer, followed by attachment of a mirror layer (e.g. an aluminum layer or a silver layer, or a specular reflective multilayer polymer film). The mirror elements may also be applied as part of a micro-optical foil to the surface of the waveguide layer in at least parts of the at least one center of the light collector or the location/area where the light transport channel is attached to the light collector.

Elements containing optical light extraction structures at the surface such as e.g. prisms, pyramids, cones, are preferably applied to the surface of the waveguide layer in at least parts of the at least one center of the light collector or the location/area where the light transport channel is attached to the light collector. The light extraction structures may be fabricated by injection molding. (nano or micro) imprint lithography, or (nano or micro) embossing and attached to the waveguide layer or may be directly engraved into the waveguide layer. The light extraction structures may also be applied as part of a micro-optical foil to the surface of the waveguide layer in at least parts of the at least one center of the light collector or the location where the light transport channel is attached to the light collector.

If the outcoupling element is formed by bending the waveguide layer towards the interior of the building to redirect the light by total internal reflection (TIR) within the waveguide layer, additional elements may preferably be applied to the end of the waveguide layer directed towards the interior of the building. These additional elements may for instance be, but are not limited to, a refractive index gradient layer to bridge the difference in refractive index between the waveguide layer and air, a cone or wedge type element, or a combination of a cone or wedge type element with a refractive index gradient layer or may be formed by a transparent refractive index matched micro (TRIMM) particles in a transparent polymer material.

The outcoupling element may preferably be designed in a way that allows at least partially controlling the angular distribution of the light that is coupled out of the waveguide layer into air. Preferably the angle alpha between the out-coupled light and the mirror lined duct used to transport the daylight deep into the interior of the building is small to minimize the number of reflections at the mirror lined duct over a given distance and thereby reducing transport losses to a minimum. The angle alpha for a large proportion of out-coupled light is preferably lower than 60°, more preferably lower than 40°, even more preferably lower than 30°.

The light collector of the present invention comprises, in one embodiment, a front panel and a back panel.

The at least one waveguide layer and optical elements attached to it including the at least one center of the collector are sandwiched between the front and the back panel and preferably held together with a frame. The frame may e.g. be made from aluminum or plastic. The construction including a front and back panel with the frame protects the at least one waveguide layer and optical elements associated with it and allows easy integration of the collector into the building envelope (i.e. the facade), in particular as part of the facade above or below window profiles. The construction including the front and back panel with the frame additionally allows avoiding formation of heat bridges at the building envelope when integrating the daylighting system into the building, particularly when including a gap filled with air or noble gas (e.g. Argon, Krypton or Xenon), in an arbitrary position between front panel and back panel.

The front panel may be the waveguide layer or it may be an additional transparent panel, i.e. a transparent glass panel or a plastic panel (poly methyl methacrylate, poly carbonate). In case it is an additional transparent panel, it may be directly attached to the waveguide layer or there may be additional layers in between, e.g. a gap filled with air or noble gas or a low refractive index layer. The back panel may be a transparent panel, i.e. a transparent glass panel or a plastic panel (polymethylmethacrylate, polycarbonate) in its entirety or it may be a transparent panel only in the area of the at least one center (or the channel attachment section) of the collector and a non-transparent panel in the area outside of the at least one center (or the channel attachment section). The back panel may also be a non-transparent panel in the area outside of the at least one center (or the attachment section) and have an opening (or hole) in the area of the at least one center (or the channel attachment section). The non-transparent panel may i.e. be an insulating panel comprising insulating materials such as expanded polystyrene, polyurethane foam or an aerogel, or it may be a concrete panel, i.e. fibrated concrete or porous concrete.

In accordance with each of the two general embodiments of the present invention, the present daylight illumination system may comprises at least one coating or film laminated to at least one glass sheet of the translucent facade element or to control its reflection and transmission properties.

For example, either of the translucent or preferably transparent panels may comprise at least one coating or film laminated to it to control its reflection and transmission properties. It may e.g. comprise an antireflection coating or film and/or an IR reflection coating or film, and/or a low-E coating or film, and/or a UV reflection coating or film, and/or an IR absorbing coating or film, and/or a UV absorbing coating or film. It may also comprise a coating or film that selectively reflects or absorbs a narrow specific range of the light spectrum, i.e. a multilayer film or coating (such as a Bragg filter). The coating or film may be used to control the spectrum of light that is transmitted into the building. Preferably the visible light spectrum from 400-700 nm is transmitted through the coating or film. At least part of the IR radiation may be reflected or absorbed by the coating or film to keep heat outside the building during periods of high temperature and inside the building during periods of low temperature. At least part of the UV radiation may be reflected or absorbed to protect the interior of the building from harmful UV radiation. It may however be preferable to let at least parts of the UV-A radiation pass through the collector to the inside of the building, where it can induce biosynthesis of vitamin A in the skin of human beings.

The at least one center of the light collector or channel attachment section may comprise the at least one waveguide layer covering the complete center area or the channel attachment section or parts of the area. At least parts of the center of the light collector or channel attachment section may have optical elements which couple the light out of the waveguide layer towards the interior of the building attached to the at least one waveguide layer. The at least one center of the collector or the channel attachment section may also comprise areas which do not comprise a waveguide layer. The center of the collector or the channel attachment section may also comprise areas which neither comprise a waveguide layer nor an optical element which couples the light out of the waveguide layers. In this case daylight may directly pass from the outside of the building through the front and back panel of the light collector towards the attached light transport channel and thus towards the inside of the building via the parts of the center area/channel attachment section not comprising waveguide layers nor optical elements. The daylight may also at least partially pass from the outside of the building directly (without Total Internal Reflection) through the waveguide layers and optical elements in the center area of the collector or in the channel attachment section towards the inside of the building.

Additional optical elements may be applied to the at least one central area of the collector to redirect the daylight that is passing directly through the center area or the channel attachment section in a way that the angle alpha between the redirected light and the mirror lined duct used to transport the daylight deep into the interior of the building is small to minimize the number of reflections at the mirror lined duct over a given distance and thereby reducing transport losses to a minimum. The angle alpha for a large proportion of redirected light is preferably lower than 60°, more preferably lower than 40°, even more preferably lower than 30°. The additional optical element may preferably be a micro-optical film with embedded specular reflective micro-lamellae as described e.g. in WO 2014/024146. The additional optical element may preferably be applied to the transparent front and/or back panel in the at least one center area or the channel attachment section of the collector.

The collector may have a broad variety of dimensions. Its thickness should however be limited in order to allow easy integration into the building envelope without resulting in bulky and disturbing extensions which might restrict the architect or planner in the building design and which compromise the aesthetics of the building. The preferred length and width of the collector may depend on the specifics of the building in which the daylighting system is employed. Preferably the dimension of the collector is chosen such that the collector occupies at least parts of the area between the windows of adjacent floors of the building.

In a preferred embodiment, the collector has a rectangular shape. The width w of the collector is limited by the width of the building, but may preferably be in a range of 0.1 m to 10 m, more preferably from 0.3 m to 5 m, even more preferably from 0.5 m to 3 m. The height h' of the collector is limited by the height of the building (if integrated into the facade) or the dimensions of the wall (if integrated in the side wall of a vehicle). Preferably the height of the collector is in a range from 0.1 m to 2 m, more preferably from 0.2 to 1 m. In another embodiment the collector has a round shape. In this case the diameter of the collector may be from 0.1 m to 2 m, preferably from 0.2 m to 1 m. The collector may also have a triangular or pentagonal or hexagonal shape or the like.

The at least one center or the channel attachment section of the collector can have a broad variety of dimensions, but is limited by the dimensions of the collector. The upper limit for thickness d' of the center or the channel attachment section may vary from 0.1 cm to 25 cm, preferably from 1 cm to 20 cm, more preferably from 2 cm to 15 cm. The thickness does not have to be constant over the entire area of the center or the channel attachment section.

The center or the channel attachment section, and the attached channel opening, may have a rectangular shape. In this case the width w of the center or the channel attachment section may preferably be in a range of 0.1 m to 2 m, more preferably from 0.2 m to 1 m, even more preferably from 0.3 m to 0.8 m. The height h of the center or the channel attachment section is in a range from 0.05 m to 1 m, more preferably from 0.1 to 0.75 m. The center or the channel attachment section, and the attached channel opening, may also have a round shape. In this case the diameter of the center or the channel attachment section may be in the range of 0.1 m to 2 m, preferably from 0.2 m to 1 m. The center or the channel attachment section, and the attached channel opening, may also have an ellipsoidal or triangular or pentagonal or hexagonal shape or the like.

In a preferred embodiment, each of (w'−w) and (h'−h) is from the range 0-0.6 m, where the value 0 denotes absence of a light collection area in accordance with the $1^{st}$ general embodiment of the invention (FIG. 1). In the $2^{nd}$ general embodiment, each of (w'−w) and (h'−h) typically is from the range 6-60 cm.

The collector may have one or several centers or channel attachment sections for attaching several light transport channels. The preferred number of centers or channel attachment sections depends on the dimensions of the collector and on the shape of the centers/channel attachment sections. The number of centers or channel attachment sections may vary between 1 and 20, preferably between 1 and 5, more preferably between 1 and 3.

In an embodiment, the area of the collector is larger than the sum of all cross section areas of the at least one centers or the channel attachment sections of the collector. The area of the collector may be 1.1 to 50 times the size of the sum of the cross-section areas of the centers or the channel attachment sections. Preferably the area of the collector may be 1.3 to 25 times the size of the sum of the cross-section areas of the centers or the channel attachment sections. More preferably 1.5 to 10 times the size of the sum of the cross-section areas of the centers or the channel attachment sections.

According to another exemplary embodiment of the present invention the light collector is constructed in the form of a prefabricated facade element.

The light collector can thus be integrated into a facade element to be used in a building. The collector may preferably be constructed in the form of a modular system that can be integrated into the facade of a building.

According to another exemplary embodiment of the present invention the light collector is embodied as a static collector and/or has flat dimensions.

The light collector of this general embodiment, as well as the façade element comprising the redirecting film in the absence of a light collector in accordance with the $1^{st}$ general embodiment, can be easily integrated in the building envelope, and does not require expensive optical elements for light collection and light transport. No moving parts like e.g. a sun light tracking system is needed. The collector can thus easily be integrated into the building skin, typically as part of the facade. Preferably the collector is integrated into a facade element, i.e. sandwiched between a double glazing unit or a between single glazing towards the outside and an insulation panel towards the interior of the building or a mixture of double glazing and a single glazing towards the outside and an insulation panel towards the interior of the building.

In an embodiment of the light collector, attached to at least one of the sides of each waveguide layer is an optical element that redirects the incident daylight and couples it into the at least one waveguide layer, where it is transported by total internal reflection (TIR) towards the center of the collector or the channel attachment section.

According to another exemplary embodiment of the present invention the edges of the waveguide layer comprise an attached mirror configured for redirecting light travelling within the waveguide layer towards the edges back towards at least one center of the collector or the channel attachment section.

This embodiment can easily be gathered from the figures. The edges of the waveguide layer, i.e. the waveguide layer, may preferably have an attached mirror which is redirecting the light travelling within the waveguide towards the edges back towards the at least one center of the collector or the channel attachment section. The mirror may e.g. be a specular reflective aluminum or silver layer or it may be multilayer polymer specular reflector.

According to another exemplary embodiment of the present invention the light collector comprises a transparent front panel and a transparent back panel, and the front and back panel are embodied as a transparent glass panel, a plastic panel, a polymethylmethacrylate panel, a methacrylate panel, or a polycarbonate panel, or any combination thereof.

According to another exemplary embodiment of the present invention the light collector comprises a cover glass, a waveguide layer, high refractive index layer or a gradient refractive index layer, a prism film with mirror coating, a substrate and a back glass.

According to another exemplary embodiment of the present invention the light collector comprises a cover glass, a PMMA layer as waveguide layer, high refractive index layer or gradient refractive index layer, a prism film with mirror coating, a PET substrate and a back glass.

According to the present invention, a daylight illumination system for integration into a building is presented. The daylight illumination system may comprise a light collector as disclosed hereinbefore or hereinafter, and comprises a light transport channel for guiding light from an outside of the building to an interior of the building. The outcoupling element of the light collector is configured for directing light from the waveguide into the light transport channel, and the light transport channel comprises walls providing total reflection of the light. Further, the light transport channel comprises at least one light distribution element at which the guided light is allowed to leave the channel into the interior of the building.

According to another exemplary embodiment of the present invention the light collector is configured for collecting light from an area that is larger than the cross-section area of the light transport channel.

The daylight illumination system of the present invention thus provides for a higher light collection efficiency as compared to known systems. In particular, the light collector may comprise a light collection area of the front surface of the light collector. In general, the light collection area defines the area where the light collector is capable of collecting light and coupling it into the waveguide layer. In this embodiment, the cross-sectional area of the light transport channel is smaller or significantly smaller than the collector area (i.e. the sum of the light collection area and the center area or the area of the channel attachment section). The light collection and redirection element or elements are located in that light collection area, although they do not have to be located on the front surface. This will become more apparent from following exemplary embodiments.

In accordance with the $1^{st}$ general embodiments the light collection area is in the same range or even smaller than the center area or the area of the channel attachment section.

According to another exemplary embodiment of the present invention the waveguide layer is a solid light guide, and wherein the light transport channel is mirror-lined duct.

In other words, this aspect of the present invention is related to the field of daylight collection and transport systems useful for interior lighting of a building. The daylighting system may include a flat light collection and light redirection section, i.e. a light collector as described before, integrated in the building envelope (facade). The daylighting system may include a collector section, in which daylight is reflected and coupled into a, preferably flat, waveguide where it is transported by total internal reflection (TIR) until it reaches a redirecting out-coupling element. The daylighting system includes a light transport channel (e.g. a mirror-lined duct) to transport daylight deep into the interior of the building and light distribution elements (luminaires) for illumination of rooms inside the building.

The daylighting system according to the invention redirects daylight into the channel, thus allowing light transport within the channel with a minimized number of reflections. It further, in its $2^{nd}$ general embodiment, allows collecting light from an area that is significantly larger than the cross-section area of the light transport canal and allows controlling the angular distribution of the light that is entering the transport canal. The daylighting system according to the invention thus shows a larger daylighting efficiency than common horizontal light tubes.

The daylight system makes use of the novel light collector including a solid or liquid waveguide, a light collection and/or redirection section or element which couples sunlight into the waveguide, and a light out-coupling and/or redirection element which couples the light out of the waveguide into a transport canal (e.g. a mirror lined duct).

The system can be used for illumination of any kind of buildings. Preferably the system is used for illumination of large office buildings, hospitals, schools, or nursing homes.

According to another aspect of the present invention a building is presented which comprises a daylight illumination as disclosed herein and an envelope with a facade in which the light collector is integrated as facade element.

In the following, details and embodiments relating to the light transport channel are provided. In the context of the present invention the term light transport channel is used interchangeably with the term light duct or mirror lined duct.

The daylighting system comprises at least one mirror lined duct to transport the daylight from (e.g. the at least one center of or the channel attachment section) the collector deep into the building. The mirror lined duct preferably may comprise a base material such as e.g. a metal (aluminum, steel) or a plastic as support. The inside of the mirror lined duct has a reflective surface. Any suitable reflector can be used in mirror-lined light ducts, including, for example metals or metal alloys, metal or metal alloy coated films, organic or inorganic dielectric film stacks, or a combination thereof. In some cases, mirror-lined light ducts can be uniquely enabled by the use of polymeric multilayer interference reflectors such as 3M optical films, including mirror films such as Vikuiti™ ESR film, that have greater than 98% specular reflectivity across the visible spectrum of light.

The reflecting layer in the present light transport channel typically shows an average reflectivity across the visible spectrum and all incidence angles (including diffuse reflectivity) of 9.5% or more, preferably of 97% or more, more preferably of 97.5% or more, and especially of 98% or more. The specular reflectivity of the major portions of the inside of the mirror lined duct is preferably larger than 90% over the whole visible spectrum and for essentially all angles of incidence. More preferably the specular reflectivity of the inside of the mirror lined duct is larger than 95%, even more preferably larger than 97%.

Where multilayer optical film is used in any optical device, it will be understood that it can be laminated to a support (which itself may be transparent, opaque, reflective or any combination thereof) or it can be otherwise supported using any suitable frame or other support structure because in some instances the multilayer optical film itself may not be rigid enough to be self-supporting in an optical device.

The mirror lined duct may preferably have a rectangular or circular cross section area. The mirror lined duct may also have a triangular or pentagonal or hexagonal cross-section area or the like.

The mirror lined duct is used to transport the daylight from the collector at the building envelope deep into the building. The mirror lined duct may have a broad variety of lengths and is preferably comprising modular elements that can be combined to any desired length. The mirror lined duct may have a length of 1 m to 40 m, preferably from 2 m to 20 m, more preferably from 4 m to 16 m.

When the collector is integrated into the facade of a building, the mirror lined duct may be horizontally attached to the ceiling of a room. It may preferably be part of a suspended ceiling. The mirror lined duct may pass through openings in cross walls and thus connect several rooms within the same floor.

In a preferred embodiment, the mirror lined duct has approximately the same cross-section area as the at least one center of the collector or the channel attachment section over its entire length. For instance, if the mirror lined duct has a rectangular shape, the width w may preferably be in a range of 0.1 m to 2 m, more preferably from 0.2 m to 1 m, even more preferably from 0.3 m to 0.8 m. The height h of the duct is in a range from 0.05 m to 1 m, more preferably from 0.1 to 0.75 m. The mirror lined duct may also have a round shape. In this case the diameter of the duct may be in the range of 0.1 m to 2 m, preferably from 0.2 m to 1 m.

In another preferred embodiment, the mirror lined duct, e.g. comprising left and right wall and bottom and top sides in case of the preferred rectangular duct, may have a non-constant cross-section area in the part located close to the facade, i.e. the cross section area may be corresponding to the at least one center area of the collector or the area of the channel attachment section at the beginning of the duct, but is narrowing down over a distance of up to 2 m, preferably up to 1 m. This narrowing down of the duct results in a secondary light concentration effect. The duct structure can be narrowing down linearly, or it can be narrowing in a compound parabolic concentrator (CPC) type geometry (circular or rectangular) or the like. Within the narrowing section of a rectangular duct, the channel walls, bottom and/or top may deviate up to 30° from the general length of the channel, i.e. a narrowing bottom section may deviate up to 30° from the horizontal. The narrowing down is preferably effected in the vertical dimension (i.e. reducing the height of the channel) but can also be used for narrowing the width of the channel. The cross-section area of the mirror lined duct may thus be reduced by a factor of 1.05 to 10, preferably 1.2 to 5, more preferably 1.4 to 5, with light losses smaller than the increase of light flux through the reduced cross section. Reduction of the cross-section area results in lower material cost and lower space requirements for the transport system.

The mirror lined duct preferably transports the light in a linear direction from the center of the collector or the channel attachment section to the interior of the building. The mirror lined duct may however also comprise bent elements that allow change of direction of the transport of light. Preferably the bent elements are only slightly bent in order to minimize light losses. The mirror lined duct may also split into two or more mirror lined ducts with a smaller cross section area after a certain distance.

The mirror lined duct may comprise a transparent element to separate fire zones, typically in a building, and comply with safety regulation. The separation element may for instance, but not exclusively, be any kind of antireflective coated glass pane with high transmittance. Preferably the usage of such separation element is avoided by placing a single mirror lined duct for one fire zone only.

The mirror lined duct may comprise an element to regulate the intensity of light transported. The regulating element may for instance, but not exclusively, be any kind of shutter or an electrochromic transparent window that allows regulation of the intensity of the light transported by the daylighting system.

The mirror lined duct may comprise at least one optical element to homogenize (mix) and/or partially diffuse the directional light which enters the mirror lined duct before it is coupled out of the duct for illumination in the building interior. The optical element to homogenize the light may be attached to the element that regulates the intensity of light transported, or it may be attached independently of the element that regulates the light intensity.

The mirror lined duct (or optionally the light collector) may comprise at least one artificial light source attached to it, preferably it is an LED light source. The artificial light source can be switched on in situations when the daylighting system does not deliver sufficient amount of daylight for room illumination. The artificial light source may be attached inside or outside the light tube. When attached inside, the luminaire defining the light distribution may be the mirror lined duct itself or an additional element coupled with the mirror lined duct.

The shutter mechanism to regulate the intensity of light transported and the artificial light source may individually be connected to a regulating system or may be connected to one common regulating system. The regulating system is preferably an automatic system connected with at least one sensor element. The at least one sensor element may e.g. be an occupancy sensor, a photometric sensor, an illuminance sensor, an irradiance sensor. The photometric sensor may analyze the spectral composition of the light. The at least one sensor may be wirelessly connected to the regulating system.

The light ducts may preferably be constructed in the form of a modular system that starts at the collector center or the channel attachment section at the facade and can be integrated in the ceiling or suspended ceiling of a floor thus extending into the depth of the building with appropriate modules selected depending on the specific needs of each room to be illuminated. The light duct may preferably be constructed from individual prefabricated modular light duct elements.

The daylighting system preferably comprises mechanical connection elements at the center of the collector or the channel attachment section and at the open ends of the light duct modules which allow to easily assemble the complete system from individual modules.

In the following details and embodiments relating to the light distribution element are provided. In the context of the present invention the term light distribution element is used interchangeably with the luminaire or luminaire element.

In the interior of the building, the daylight is coupled out of the mirror lined duct through luminaire sections and distributed in the rooms for room illumination.

Luminaire sections may interrupt the mirror lined duct at the side(s) of the duct directed towards the interior of the room. Where the mirror lined ducts are horizontally suspended on the ceiling of a room, the luminaire section is preferably located at the part of the duct pointing towards the floor of the room.

The luminaire sections generally comprise an area of the mirror lined duct which is at least partially transparent for daylight, i.e. the specular reflective mirror is not covering the inside of the duct at all or is disrupted in the luminaire section. The luminaire section may comprise a transparent opening in the mirror lined duct through which the light is directed into the room to be illuminated. The transparent opening (light output surface) may preferably comprise a transparent plate, e.g. a glass plate or plastic plate (PMMA, poly carbonate or silicone) through which the light is redirected into the room. The transparent plate may be a flat plate or may be a 3D structure extending out of the mirror lined duct or into the mirror light duct. The 3D structure may have any geometrical shape, including (but not limited to) e.g a dome type shape, a triangular roof type shape, or a rounded vault type shape.

Attached to the at least one luminaire section may be an out-coupling element that redirects the light towards the room to be illuminated. The redirecting element may e.g. be a mirror type element protruding into the mirror lined duct or may be a transparent optical element, such as e.g. a prism, cone, or pyramid protruding into the mirror lined duct and redirecting the light by total internal reflection (TIR). The redirecting element may also be a micro-optical film laminated to the transparent plate in the luminaire opening. The redirecting element may also contain a light homogenizing (or mixing) functionality.

The at least one luminaire element may comprise attached light controlling (or steering) optical elements that distribute the redirected light after coupled out from the mirror lined duct in the room to be illuminated according to the specific needs of the room. The steering elements may be any optical elements fulfilling this task, such as e.g. lenses, reflector type elements, regularly or irregularly structured surface type elements, or micro-optical films.

The at least one luminaire may comprise a combination of a light redirecting element and a light steering element attached to it. Preferably the combination of a light redirecting element and a light steering element attached to it comprises two micro-optical films, i.e. a redirecting film and a steering film.

In one preferred embodiment, the luminaire element may include a steering film having a plurality of ridges adjacent to the redirecting film and opposite the light output surface, each ridge parallel to the longitudinal axis and disposed to refract an incident light ray from the redirecting film, wherein a light ray that exits the duct through the light output surface is redirected by the redirecting film within a first plane perpendicular to the light duct cross-section, and further redirected by the steering film within a second plane parallel to the light duct cross section. Redirecting films, steering films, and plurality of void configurations are further described, for example, in PCT Publication Nos. WO2014/070495 entitled CURVED LIGHT DUCT EXTRACTION, and WO2014/070498 entitled RECTANGULAR LIGHT DUCT EXTRACTION, the disclosure of which are both herein incorporated in their entirety.

The dimensions of luminaires may vary in a broad range and are limited only by the size of the mirror lined ducts. The dimensions of luminaires are selected according to the available light flux of the daylighting system and the illumination needs in the interior of the building.

The luminaire may extend as a single section along the complete length of the mirror lined duct or at the cross section end of the mirror lined duct, or two or more luminaires can be located along the mirror lined duct in separate sections. Preferably luminaire sections located near the end of the duct (i.e. in the depth of the building) may be larger than those close to the building envelope.

For rectangular shape light ducts, the luminaire section may preferably extend over the whole width of the duct or may only cover a part of the width, or may cover the whole width additionally including parts of the sidewalls. For circular shape ducts the luminaire section may cover less than half of the circumference of the duct or may cover as much as the whole circumference of the duct.

The light ducts may preferably be constructed in the form of a modular system extending into the depth of the building with appropriate modules including modules that comprise at least one luminaire section selected depending on the specific needs of each room to be illuminated. The light duct may preferably be constructed from individual prefabricated modular light duct elements including light duct elements that comprise at least one luminaire section.

The daylighting system of the present invention is preferably applied to a building with its collector integrated into the building envelope. Building envelope means the facade or window including its thermal shield elements. The system can be integrated directly in the facade or in elements of the facade which are protruding, such as a balcony or curtain type construction elements.

In the northern hemisphere, the daylighting system may advantageously be applied to a south directing facade, an east directing facade, or a west directing facade. More generally speaking it may be applied to a facade pointing in any direction from east to south to west, more preferably in a direction pointing mostly towards south. In the southern hemisphere, it may advantageously be applied to a north directing facade, an east directing facade, or a west directing facade. More generally speaking it may be applied to a facade pointing in any direction from east to north to west, more preferably in a direction pointing mostly towards north.

Besides use in buildings, the present may be used for illuminating the interior of vehicles, typically larger vehicles such as ships or trains, especially where such vehicles comprise interior rooms without windows or with windows too small to provide sufficient daylight illumination. In the case of ships, such rooms must be positioned above sea level, but may be distant from the outer side wall of the vehicle as described for buildings above. Mounting of the light channel into the vehicle is analogous to the mounting into a building, i.e. typically under the room ceiling with the channel's front opening attached to an outside window of the vehicle. Advantageously, large vehicles for passenger transport or recreation may be equipped with the present daylight illumination system, for example cruise ships. The present invention thus further relates to a daylight illumination system for integration into a vehicle, the daylight illumination system comprising a translucent wall element (800) containing a glass sheet and a light redirection element (302 or 708), and a light transport channel (801) for guiding light about horizontally into an interior of the vehicle, the light transport channel comprising one opening attached to the interior side of said wall element and at least one opening towards the interior of the vehicle, characterized in that the light redirection element (302 or 708) is formed as a structured polymer film or sheet attached to a glass sheet of the wall element (800) and is configured for changing the direction of incident light into the about horizontal light transport channel. The invention thus further pertains to a vehicle comprising a daylight illumination system as described above, and an outer wall in which the light redirection element, especially the light redirecting film, is integrated in a wall element or window.

These and other features of the invention will become apparent from and elucidated with reference to the embodiments described hereinafter.

BRIEF DESCRIPTION OF THE DRAWINGS

FIG. 5 schematically shows a cross-section through a light collector with outcoupling elements on the surface of a backplane according to an exemplary embodiment of the present invention.

FIG. 6 schematically shows a cross-section through a light collector with a bent waveguide layer to direct light towards the interior of a building according to an exemplary embodiment of the present invention.

FIG. 7b schematically shows a first cross-section through the light collector of FIG. 7a.

FIG. 7c schematically shows a second cross-section through the light collector of FIG. 7a.

In principle, identical parts can be provided with the same reference symbols in the figures.

DETAILED DESCRIPTION OF EMBODIMENTS

Figure 1:
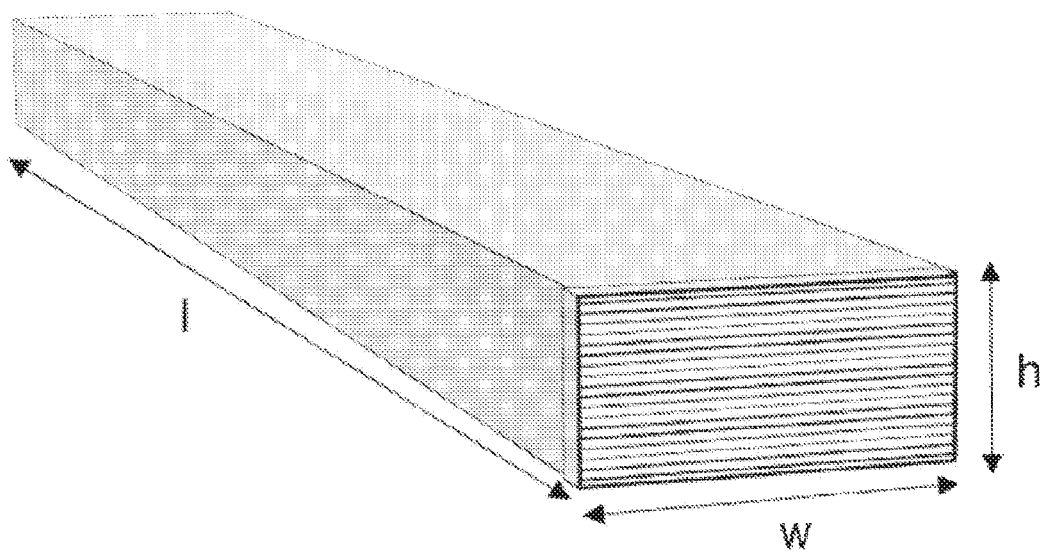
FIG. 1 schematically shows a daylight illumination system for integration into the building with a closed front surface according to the $1^{st}$ embodiment of the present invention.

FIG. 1 schematically shows an example for a daylight illumination system and for integration into the building (see FIG. 800) with a closed front surface according to the $1^{st}$ embodiment of the present invention. The facade element comprising a section of width w and height h (i.e. roughly the cross section of the channel) contains at least one light redirection element which is configured for coupling sunlight into light transport channel of length l.

Figure 2:
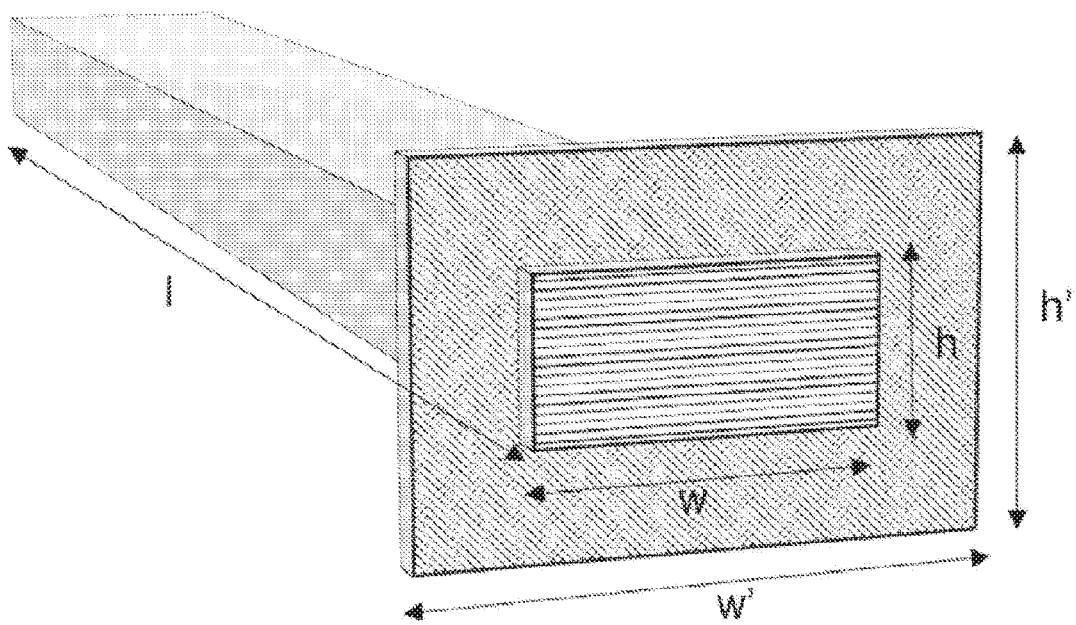
FIG. 2 schematically shows a daylight illumination system for integration into the building with a facade element according to the $1^{st}$ or $2^{nd}$ embodiment of the present invention, indicating the distinction between the center area or the area of the channel attachment section (cross section h×w) and the non-active area or light collection area (cross section h'×w') and according to the 2 exemplary embodiments of the present invention.

FIG. 2 schematically shows a daylight illumination system comprising a facade element according to the $1^{st}$ or $2^{nd}$ embodiment of the present invention: The element of width w' and height h' contains an at least partially transparent channel attachment section of width w and height h, which in this embodiment is a central section. According to the $1^{st}$ embodiment of the present invention, the façade element is of width w' and height h', contains a light redirecting element in its central section of width w and height h, and does not contain a light collector. According to the $2^{nd}$ embodiment of the invention, the central section is surrounded by a collector section or light collection area (w'×h'−w×h), in which the waveguide layer extends and where light is collected by the waveguide layer. This light collector further comprises at least one outcoupling element configured for coupling light from the waveguide layer into the light transport channel (see also reference sign 801 in FIG. 8) of the daylight illumination system. This allows that the light collector to gather light from an area that is larger than the cross-section area of the light transport channel, which will become even more apparent from the explanations of FIG. 3. The system collects light in a different manner compared to the prior art and also guides the collected light in a different manner towards the light transport channel.

As can be gathered from FIGS. 1 and 2, the present daylight illumination system does not comprise any moving parts for sun tracking and has flat dimensions. The system is not based on fiber optics and, as a prefabricated element, the system can be integrated smoothly into the glass facade and the building envelope to be exposed to daylight.

The light transport channel extends from and is connected to the channel attachment section/central section of the facade element (in FIG. 2 indicated with the center cross section of width w and height h).

Figure 3:
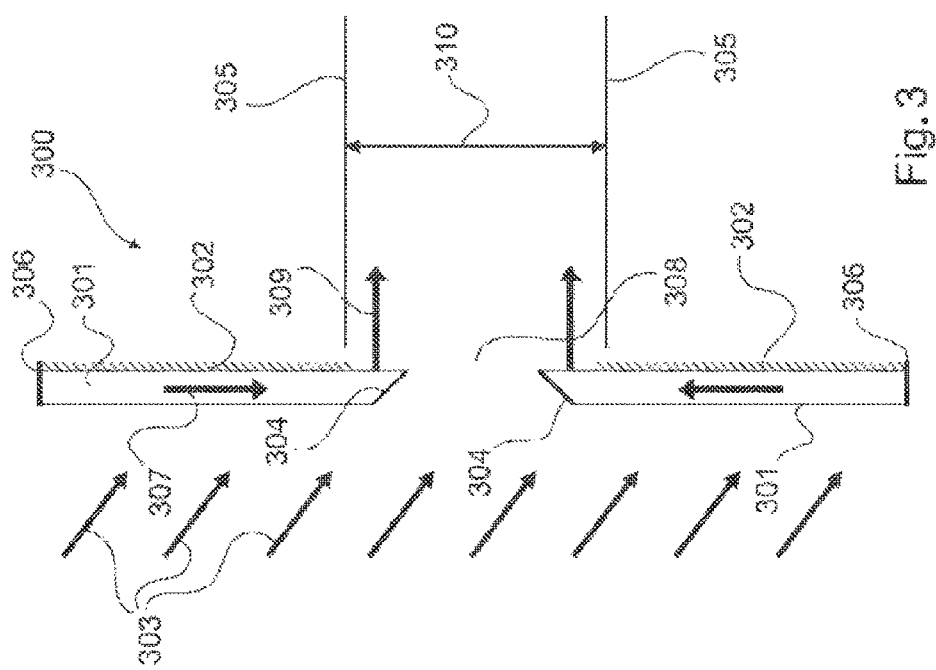
FIG. 3 schematically shows a cross-section through a light collector with a light transport channel according to an exemplary embodiment of the present invention.

FIG. 3 shows a cross-section through a light collector 300 according to the second embodiment of the invention with an at least partially transparent central section through which light can directly enter the light transport channel 305 according to an exemplary embodiment of the present invention. This collector is similar to the light collector shown in FIG. 2. The light collector 300 is embodied as our pre-fabricated facade element. The light collector 300 comprises a waveguide layer 301, a light collection and redirection element 302 which is configured for coupling sun light 303 into the waveguide layer 301. Further, an outcoupling element 304 configured for outcoupling light from the waveguide layer into a light transport channel 305 which can be part of the daylight illumination system. The waveguide layer 301 can be embodied in several different ways as has been explained in detail hereinbefore. Solid and/or liquid light guides may be used. In a preferred embodiment the waveguide layer 301 is embodied as a light guide plate which is part of the sandwich construction of the light collector 300. Out coupling element 304 is embodied as a mirror coupling light out of the waveguide layer 301 towards the interior of the building and thus into the light transport channel 305. The light which is transported in the waveguide layer by Total Internal Reflection (TIR) is shown with reference sign 307 and the light which is coupled out of the collector is shown with reference sign 309. The outer edges of the waveguide layer 300 comprise an attached mirror 306 configured for redirecting light travelling within the waveguide layer towards the edges back towards at least one center or the channel attachment section 308 of the light collector. Due to the use of the waveguide layer which is embodied as a waveguide plate or a waveguide panel within a facade element and also due to the light collection by TIR in the solid waveguide layer, the light collector is configured for collecting light from an area that is larger than the cross-section area of the light transport channel. The light that is collected in a large light collection area (see FIG. 2) is guided by the light collector to a comparatively smaller light transport channel. Thus, when comparing the present invention with systems which only collect light in an area that is defined by the cross-section of the light transport channel, this leads to an increase of the amount of light that is guided into the building. The daylight illumination system of the present invention thus provides for a higher light collection efficiency as compared to know system.

Figure 4:
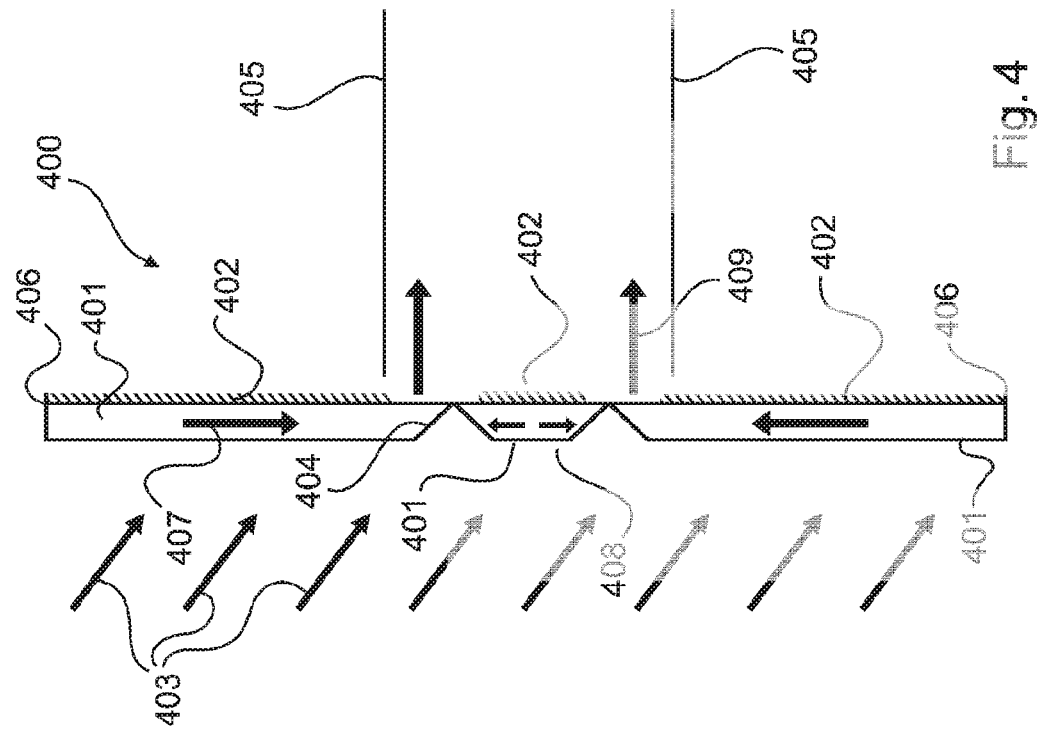
FIG. 4 schematically show a cross-section through a light collector with a light transport channel according to an exemplary embodiment of the present invention.

FIG. 4 schematically show a cross-section through a light collector 400 according to the second embodiment of the invention with a closed front surface (i.e. where no light can directly enter the light transport channel, in other words all the light is redirected and transported through the waveguide layer), similar to the light collector shown in FIG. 2, and a light transport channel 405 according to an exemplary embodiment of the present invention. The light 407 couple into the light collector is transported towards the mirrors 404 which reflect the light towards the light transport channel

409. The light 409 which is coupled out can thus travel in the mirror-lined duct 405 via Total Internal Reflection (TIR) into the building. The light collection and redirection element 402 is also located in this embodiment at the back panel or backplane of the laminated sandwich structure of light collector 400. Light collector 400 also comprises mirrors 406 to redirect the light towards the outcoupling elements 404. As can be seen from FIG. 4, the waveguide layer 401 is also located in the centre 408 of light collector 400 such that also in this central area the daylight 403 can be coupled into the system, transported to the outcoupling elements and can be coupled into the light transport channel 405.

FIG. 5 schematically shows a cross-section through a light collector 500 according to the second embodiment of the invention with outcoupling elements on the surface of a layer directed towards the interior of the building according to an exemplary embodiment of the present invention. FIG. 5 further shows that the outcoupling element of the light collector is embodied as light extraction elements 503 that are located at a surface adjacent to the waveguide layer 501. It is also schematically shown that the light collection and redirection element 502 is located at the same depth of the light collector as the outcoupling element 503. The light extraction elements are used in this embodiment instead of the mirrors 404 in FIG. 4. However, also a combination of these elements is possible. The light extraction elements may e.g. be applied as part of a micro-optical foil to the surface of the waveguide layer, for example in at least parts of the at least one center of the light collector or the channel attachment section.

FIG. 6 schematically shows a cross-section through a light collector 600 according to the second embodiment of the invention with a bent waveguide layer 601 to direct light 604 towards the interior of a building according to an exemplary embodiment of the present invention. The bent section is shown with reference sign 603. Light collection and redirection element 602 is also shown. Additional elements may preferably be applied to the end of the waveguide layer directed towards the interior of the building. These additional elements may for instance be, but are not limited to, a refractive index gradient layer to bridge the difference in refractive index between the waveguide layer and air, a cone or wedge type element, or a combination of a cone or wedge type element with a refractive index gradient layer or may be formed by a transparent refractive index matched micro (TRIMM) particles in a transparent polymer material. The collector shown here can be combined with a front and/or back panel. This is also the case for collectors 500, 400 and 300 disclosed hereinbefore.

Figure 7A:
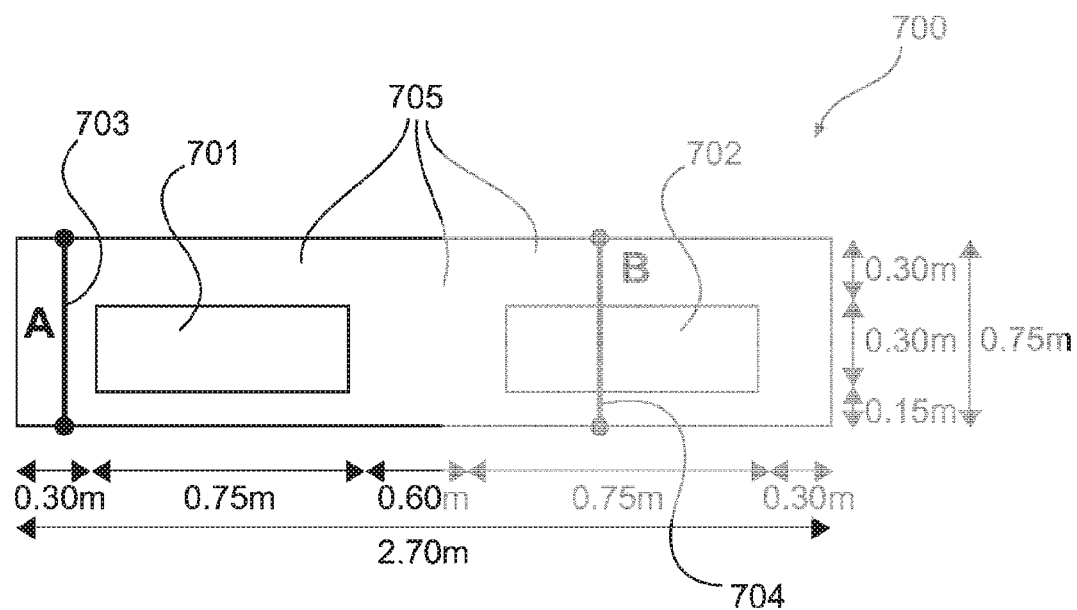
FIG. 7a schematically shows a front view of the light collector according to an exemplary embodiment of the present invention.

FIG. 7a schematically shows a front view of the facade element with two at least partially transparent central sections. Facade element 700 comprises two sections 701, 702 which are channel attachment sections since a light transportation channel is attached to the interior there. In general, the light collection area defines the area where the light collector is capable of collecting light and redirecting it into the light transport channel. Furthermore, specific dimensions of an individual exemplary embodiment of the light collector are shown in FIG. 7a.

Figures 7B, 7C:
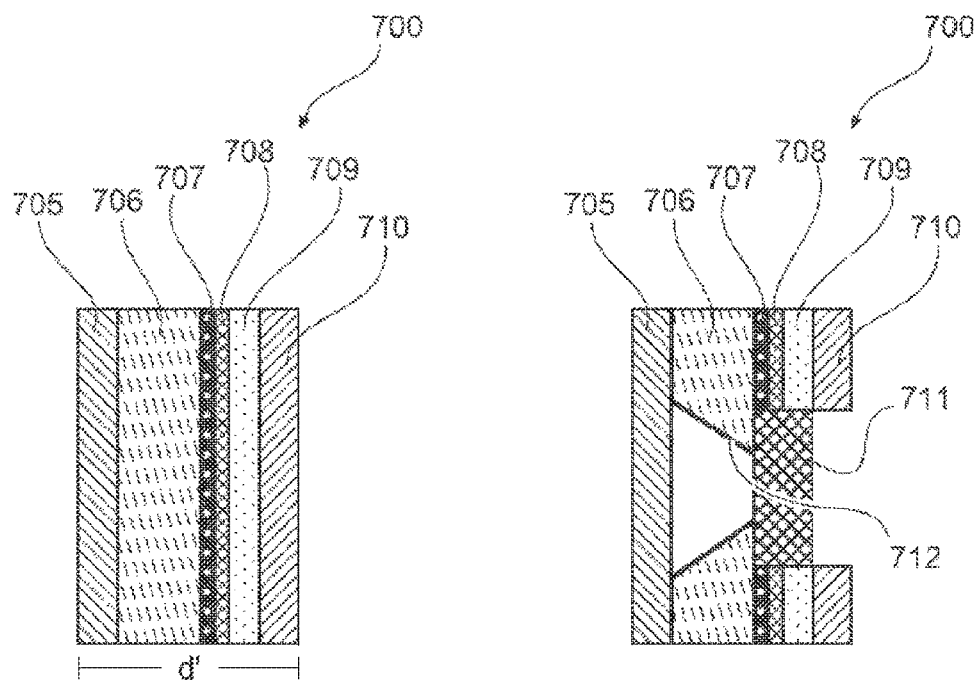

FIG. 7b schematically shows a first cross-section through the facade element 700 of FIG. 7a along line A or line B in accordance with the first embodiment of the invention (see reference signs 703 and 704 in FIG. 7a), or along line A in case of a facade element comprising waveguide layer and outcoupling element according to the second embodiment of the invention, see reference sign 703 in FIG. 7a. The specific embodiment of the facade element 700, which also functions as a light collector, comprises a cover glass 705 (for example 3 mm thickness), a PMMA or PVB layer 706 (for example 3 cm thickness), an optional high refractive index layer or gradient refractive index layer 707 (for example 0.07 mm thickness), a prism film with mirror coating 708 (for example 0.07 mm) as a light collection and/or redirection element, a PET or PVB substrate film 709 (for example 0.2 mm thickness) and a back glass or insulation 710 (for example 3 mm thickness). In case of the $1^{st}$ embodiment of the invention, layer 706 may be replaced by an air gap as typical for thermal insulation glazings. In a preferred variant of the $1^{st}$ embodiment of the invention, the mounting is reversed, with glass sheet 710 forming the exterior side of the facade element and glass sheet 705 forming the side if the facade element, where the light transport channel is attached.

Similar to FIG. 7b, FIG. 7c schematically show a second cross-section through the light collector 700 of FIG. 7a for the second embodiment of the invention, along line B, see reference sign 704 in FIG. 7a. In addition to the elements shown and explained in the context of FIG. 7b, the back glass 711 (for example 3 to 3.35 mm thickness) and the redirecting mirror 712 as out coupling element are shown in FIG. 7c.

It must be noted that the structure of the light collector shown and explained in the context of FIGS. 7a to 7c is not bound to the exemplary dimensions shown in FIG. 7a, but can also be applied to other lengths, widths etc. Thus, the layered structure of this embodiments is to be seen and is disclosed herewith as being independent from the numeral dimensions shown in FIG. 7a. The same holds true for the building and the daylight illumination of following FIG. 8.

Figure 8:
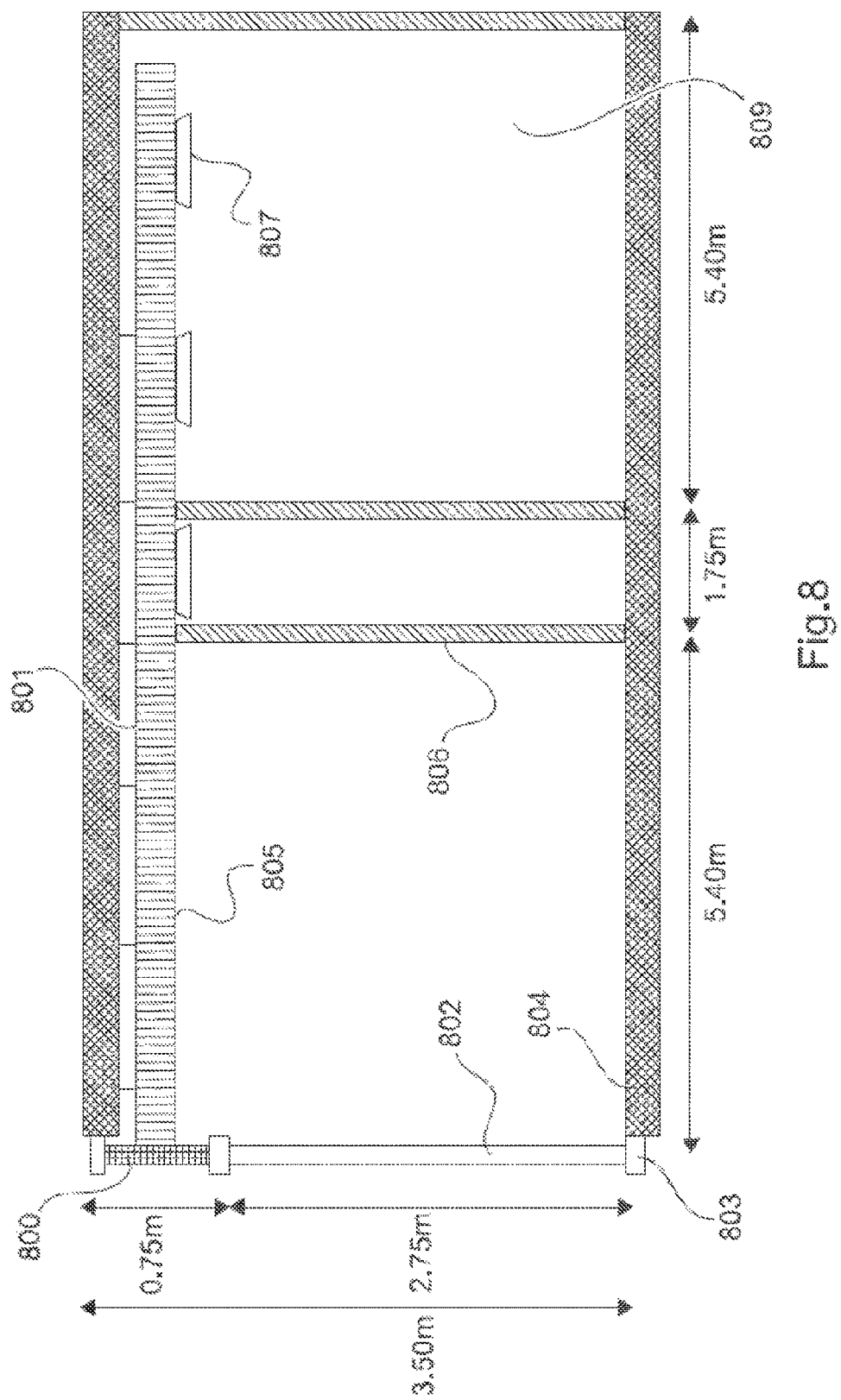
FIG. 8 shows a building with daylight illumination system according to an embodiment of the present invention.

FIG. 8 shows a section of a building with a daylight illumination system according to an embodiment of the present invention. The daylight illumination system comprises a facade element or light collector 800 and a light transport channel 801. The light transport channel is for guiding light from an outside of the building to an interior of the building. The light transport channel 801 comprises walls which provides for internal reflection to guide the light from the light collector 800 towards the desired room 809 of the building. In FIG. 8 the light transport channel is embodied as a mirrored horizontal light tube 805. Also a light distribution element 807 in form of the daylight luminaire is shown. The building of FIG. 8 also comprises a window 802, several walls 806, frame 803 and the floor 804.

Figure 9:
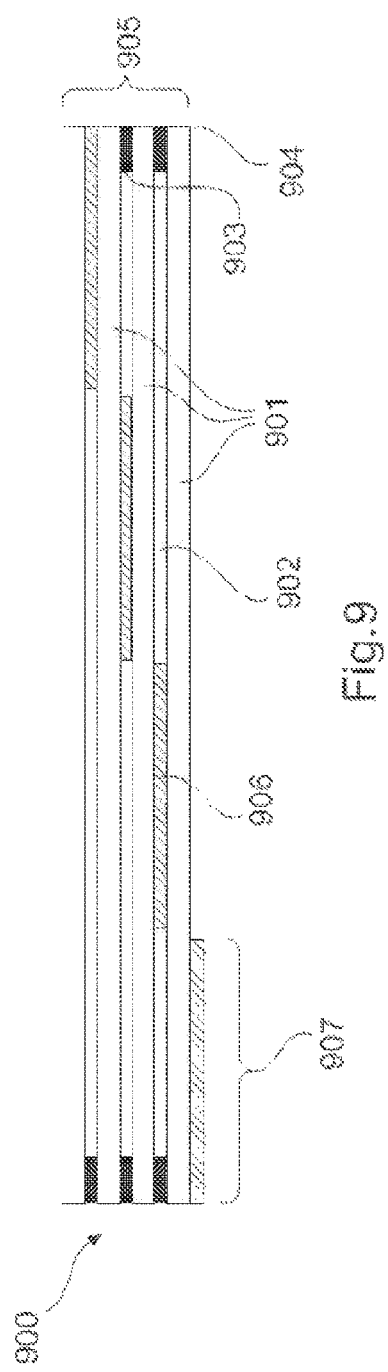
FIG. 9 schematically shows a cross-section of an exemplary four layer light collector with all light guide plates of identical size.

FIG. 9 schematically shows a cross-section through the light collection area of a light collector according to the second embodiment of the present invention. Light collector 900 consists of a plurality 905 of waveguide layers 901, the light collection and redirection element 906 that redirects the incident daylight consists of a plurality of stripes or patches attached to each of the plurality of waveguide layers, the stripes or patches displaced towards each other in a way that combined they cover the whole area or the entire width of the light collection area. Between the plurality of waveguide layers air gaps 902 are provided. At the edges or lateral ends of the light collector 900, distance holders 903 are provided between the individual waveguide layers. Furthermore, reflectors 904 are provided at the edges or lateral ends of the light collector 900. In an embodiment, the width 907 of the light collection and redirection element 906 may be 3 cm for a thickness of waveguide layer 901 of 1 cm. FIG. 9 only shows a part of the light collector 900 and only shows the light collection area in which the light is coupled into the waveguide layer. The light will be guided further to the left where the section or area is located in which the outcoupling element is located.

Figure 10:
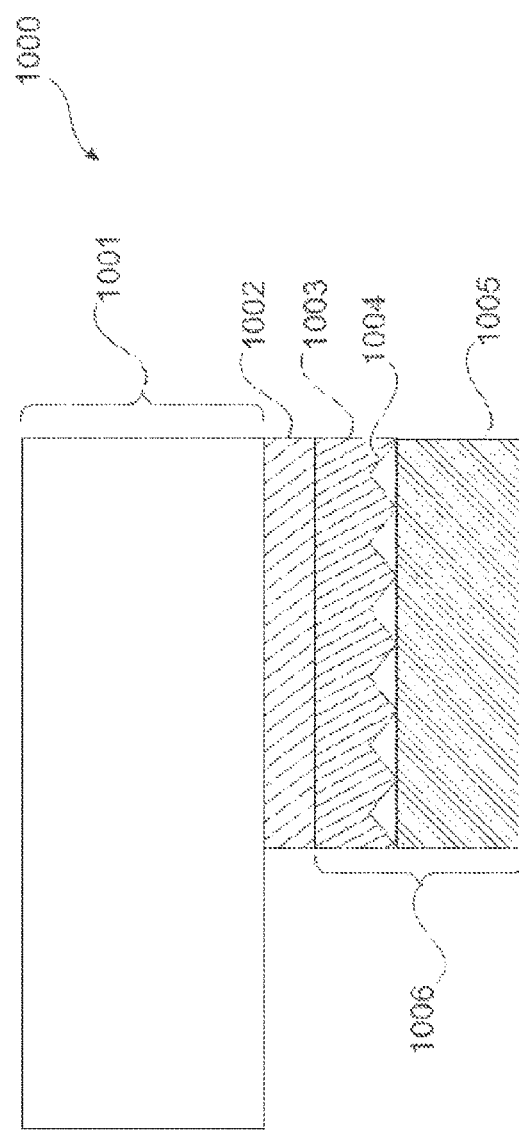
FIG. 10 schematically shows a cross-section of an exemplary light collector with a light collection and redirection element with a V-groove prism structure.

FIG. 10 schematically shows a cross-section of a part of an exemplary light collector 1000 with a light collection and redirection element 1006 as of the second embodiment of present invention embodied as a micro-optical film with a V-groove prism structure. An adhesive layer 1002 (e.g. 25 micrometer, n=1.6) is used below the waveguide layer 1001 (e.g. 1 cm of PMMA, n=1.5) and below the adhesive layer 1002 a high refractive index layer (e.g. 50 micrometer, n=1.7) is used. The prism layer 1004 (e.g. 25 micrometre Acrylate coated with an Aluminium mirror of e.g. 50 nanometer) is located on top of the substrate (e.g. PET, 100 micrometre). In other words, between the light collection and redirection element 1006 and the waveguide layer 1001, a gradient refractive index layer with two layers is used. There is one layer of n=1.7, the high refractive index layer, and one layer of n=1.6, i.e., the adhesive.

Figure 11:
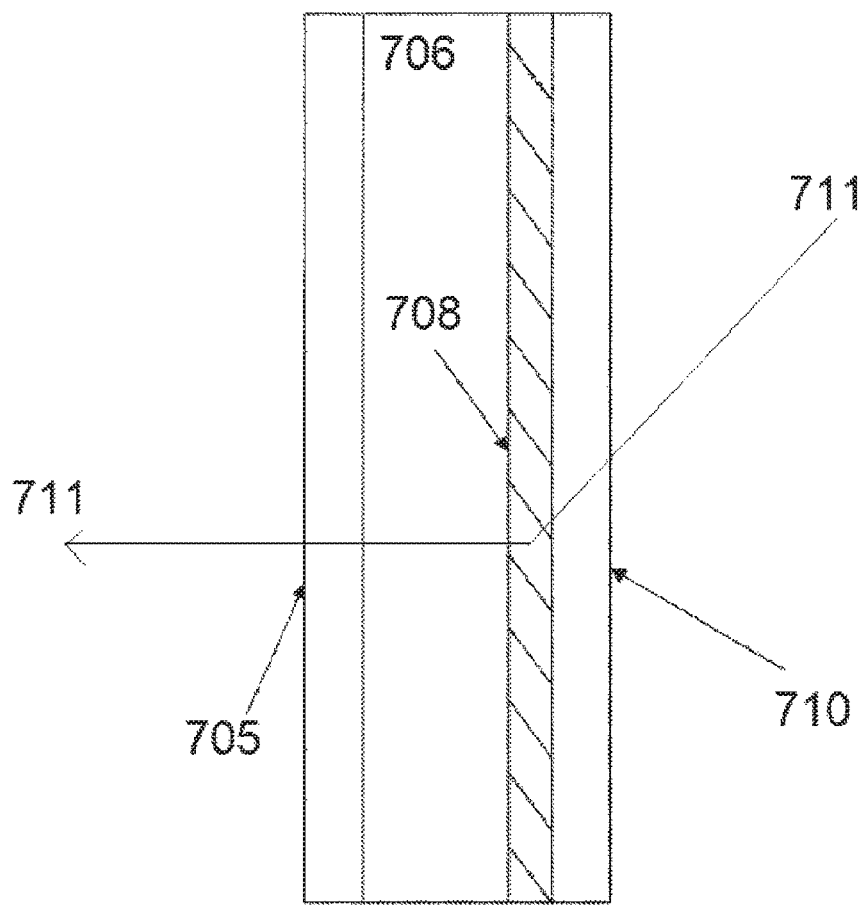
FIG. 11 schematically shows a cross section of an exemplary facade element comprising two glass sheets (705, 710) and an air gap 706 in between, where a polymer film 708 comprising the light redirecting element is attached to one of the glass sheets.

FIG. 11 shows a schematic cross section of an exemplary facade element as it may be part of the 1$^{st}$ embodiment of present invention comprising two glass sheets (705, 710) and an air gap 706 in between, where a polymer film (typically a PVB film) 708 comprising the light redirecting element is attached on the interior side of one of the glass sheets. In a preferred variant of this assembly, glass sheet 710 carrying redirecting film 708 is on the exterior side of the building, light 711 enters the building through sheet 710, gets redirected by film 708, and enters the light transport channel (not shown in this FIG. 11), which is attached to glass sheet 705.

Figure 12:
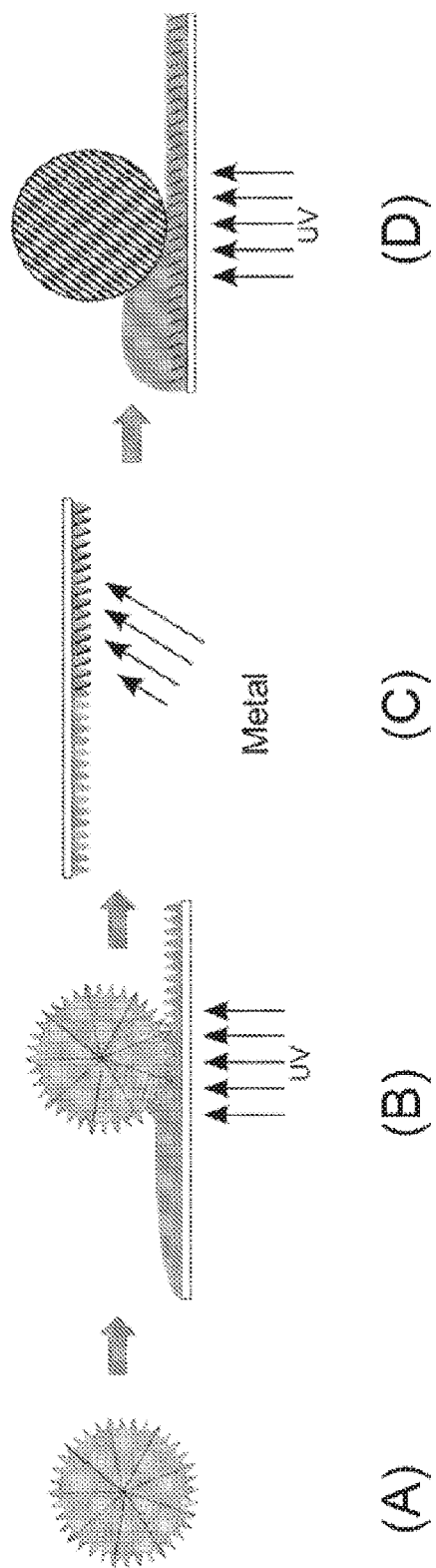
FIG. 12 shows a process for preparing a redirecting polymer film.

FIG. 12 shows a process for preparing a redirecting polymer film: Using a suitable microstructuring tool (A), a UV curable coating on a suitable polymer film is structured and cured (step B). The structured layer thus obtained is subjected to metal vapour under an oblique angle (C). Subsequently, another resin layer is coated, which covers the metallic microplanes and fills the gaps between the structures to provide a smooth polymer surface (step D).

Figure 13:
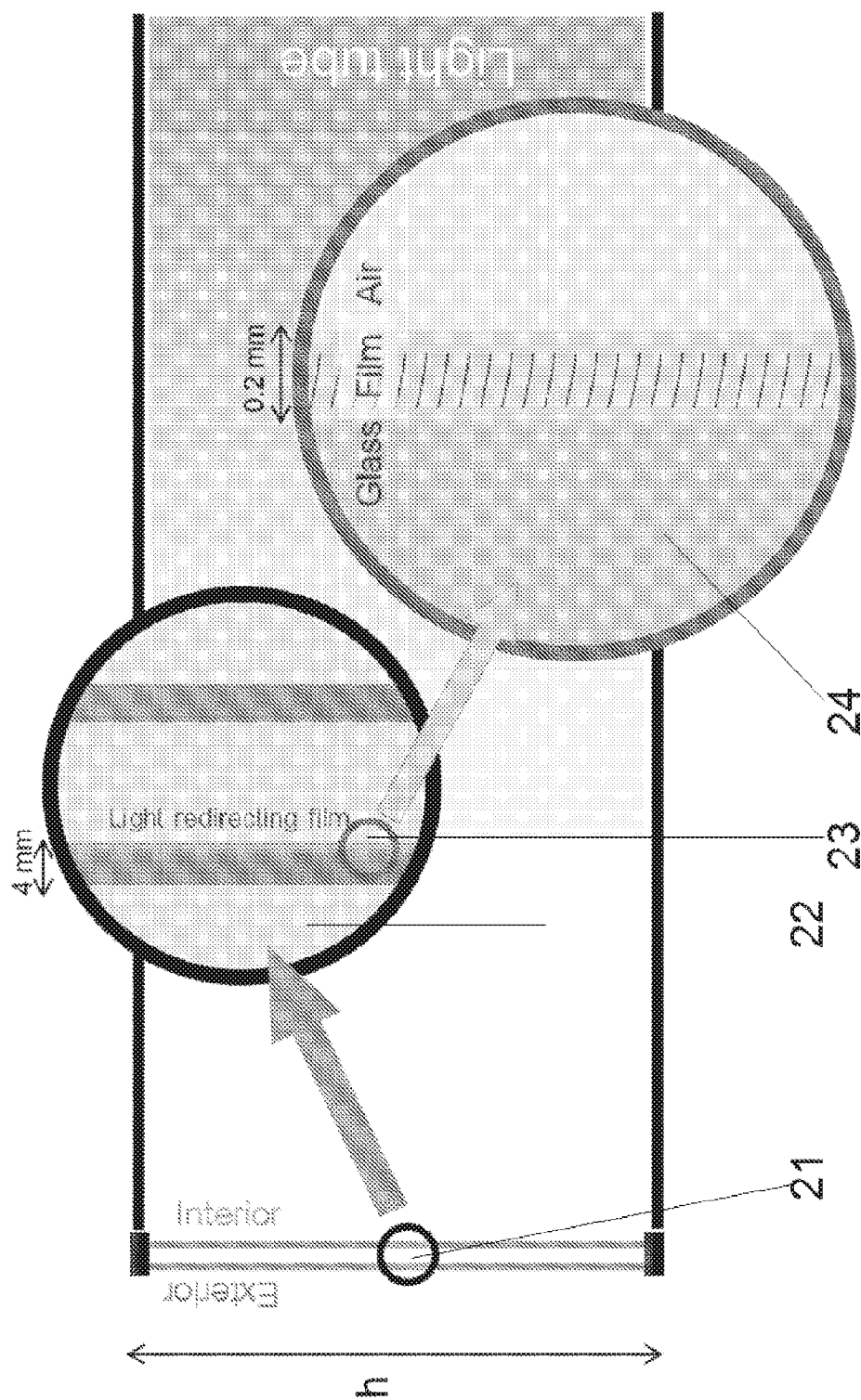
FIG. 13 shows an example for the front part of the present general embodiment 1 with section 24 giving a magnification of section 23 within section 22, which section 22 gives an enlarged view of the front plate section 21.

FIG. 13 shows an example with typical dimensions for the front part of the present light channel with double glass front plate of height h comprising a redirecting film (general embodiment 1). Section 24 shows a part of the exterior glass sheet covered by the present light directing film of 0.2 mm thickness; section 24 showing an enlarged part from section 22, which depicts a fraction of the double glass unit's cross section, again indicating the positioning of the present light redirecting film (thickness of exterior glass sheet with redirecting film in this example: 4 mm). Section 22 itself represents the enlarged view of section 21 (front plate).

Figure 14:
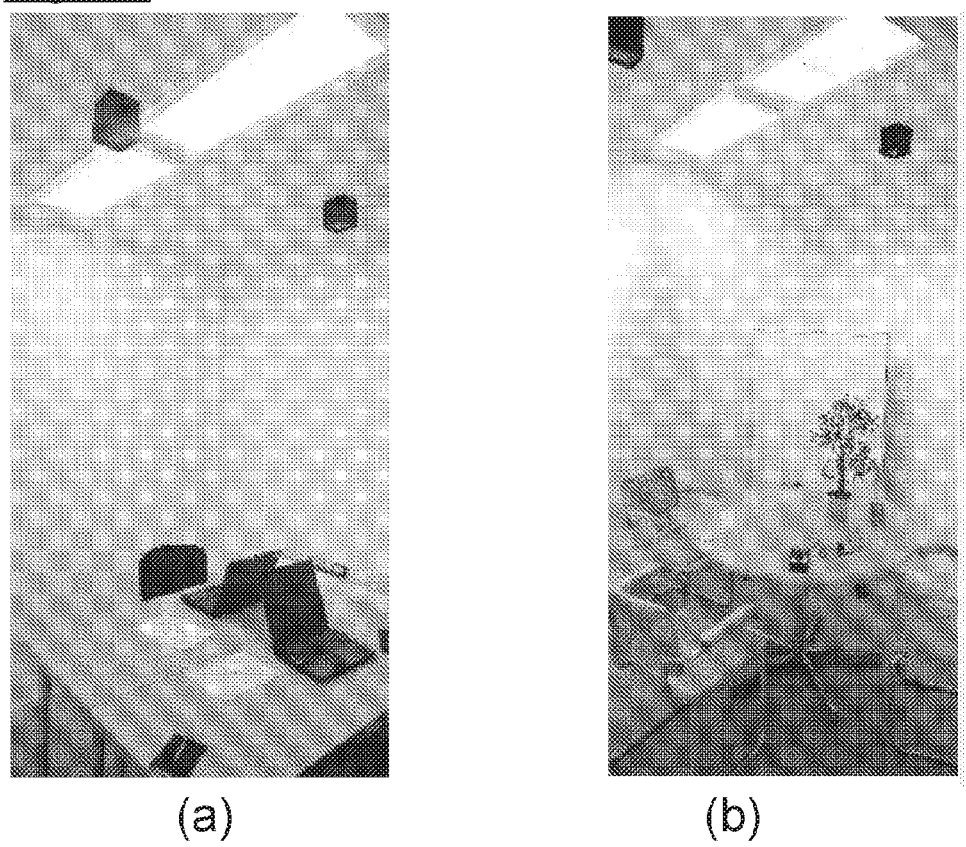
FIGS. 14a and 14b shows 2 photographs of offices illuminated with the present in accordance with the present invention (prototype, embodiment 1).

FIGS. 14a and 14b show 2 photographs of offices illuminated by the 2 parallel prototype light channels of example 2 (luminaires beginning at 8 m distance in FIG. 14b, and at 11.1 m distance from the façade in FIG. 14a).

Figure 15:
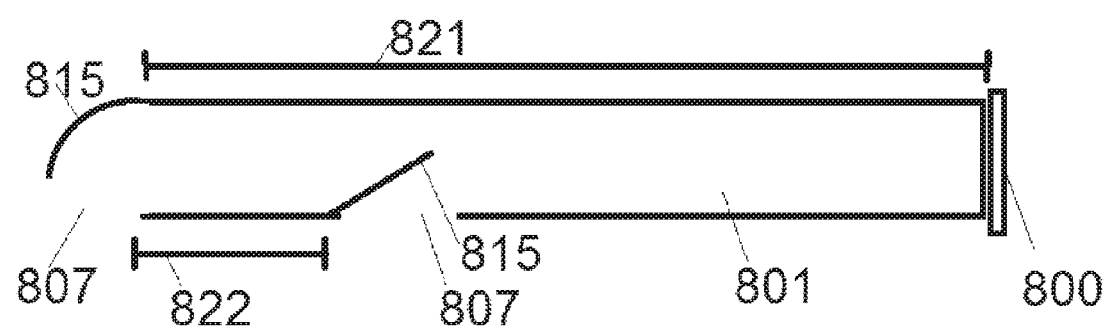
FIG. 15 shows the construction of the prototype light channel.

FIG. 15 shows the cross section (side view) of the prototype light channels of example 2; 800 denotes the insulating glass unit of the façade (4 mm glass sheet, 12 mm air gap, 4 mm glass sheet) containing the redirecting film; 801 denotes the volume of the light channel; 807 denotes the 2 openings (Luminaires, side view showing their short side) the one at the channel end sized 29 cm×83 cm and the one towards the middle of the channel sized 30 cm×80 cm; 815 denote the rounded reflector at the end of the tube (radius 29 cm) and the reflective sheet over the middle luminaire; 821 indicates the straight tube length of 11.1 m; 822 indicates the distance between the 2 luminaire openings of 2.8 m.

The invention thus may be further represented by the following embodiments:

1. A daylight illumination system for integration into a building, the daylight illumination system comprising a translucent facade element (800) containing a glass sheet and a light redirection element (302 or 708), and a light transport channel (801) for guiding light about horizontally into an interior of the building, the light transport channel comprising one opening attached to the interior side of said facade element and at least one opening towards the interior of the building, characterised in that
the light redirection element (302 or 708) is formed as a structured polymer film or sheet attached to a glass sheet of the facade element (800) and is configured for changing the direction of incident light into the about horizontal light transport channel.

2. Daylight illumination system of embodiment 1, wherein the light transport channel comprises at least one opening towards the interior of the building equipped with a light distribution element (807) allowing the guided light to leave the channel into the interior of the building, the light transport channel preferably containing an air or gas filling being sealed against the ambient atmosphere.

3. Daylight illumination system of embodiment 1 or 2, wherein the openings of the light transport channel for light entry and for a light distribution element (807) are arranged about rectangularly to each other, the light channel preferably being suitable for mounting with the opening for light entry, and attached facade element (800) with light redirection element (302), about vertically, and the opening for light distribution element (807) about horizontally.

4. Daylight illumination system of embodiment 1, 2 or 3, wherein the light guiding inner walls of the light transport channel (801) are covered by a reflective layer, preferably a reflective silver or aluminum layer or a reflective multilayer polymer film, most preferably providing at least 95% directed reflection and less than 5% diffuse reflection.

5. Daylight illumination system according to any of embodiments 1 to 4, wherein the translucent facade element (800) comprises an insulating glazing unit containing at least 2 parallel glass sheets and at least one polymer film, wherein the total thickness of the facade element (800) preferably is from the range 10 to 1000 mm, especially 15 to 50 mm.

6. Daylight illumination system according to any of embodiments 1 to 5, wherein the translucent facade element (800) comprises at least 2 parallel glass sheets, and the light redirection element (302) is attached to the interior surface of the glass sheet suitable for forming a section of the outer surface of the building envelope.

7. Daylight illumination system according to any of embodiments 1 to 6, wherein the cross section of the light transport channel (801) has a height from the range 8 to 50, especially about 10 to 35 cm; has a width from the range 20 to 300 cm, especially about 30 to 120 cm; and the length of the light transport channel (801) is from the range 500 to 2000 cm, especially about 600 to 1200 cm.

8. Daylight illumination system according to any of embodiments 1 to 7, wherein the translucent facade element (800) comprises a light collector (100, 200, 700, 800), the light collector comprising
at least one waveguide layer (301),
at least one light collection and redirection element (302) which is configured for coupling sun light (303) into the waveguide layer, and
at least one outcoupling element (304) configured for outcoupling light from the waveguide layer into a light transport channel (801) of the daylight illumination system.

9. Daylight illumination system according to any of the above embodiments, wherein the light redirection element (302 or 708) is embodied as a plurality of grating couplers and/or holograms and/or mirrors and/or micromirrors and/or reflective microstructures.

10. A building comprising
a daylight illumination system according to any of embodiments 1 to 9, and an envelope with a facade in which the light collector is integrated as facade element.

11. The use of a daylight illumination system according to any of embodiments 1 to 9 for introducing daylight into the interior of a building in 5 to 20, especially 6 to 12, meter distance from a window.

12. A method for improving the light quality in a building by increasing the amount of daylight brought into the building, characterized in that a daylight illumination system according to any of embodiments 1 to 9 is integrated into the building envelope, with its light transport channel aligned about horizontally away from the building's facade.

13. A light collector (100, 200, 700, 800) for use in a daylight illumination system (800), especially as described in the above embodiments 1 to 9, and for integration into a building, the light collector comprising
at least one waveguide layer (301),
at least one light collection and redirection element (302) which is configured for coupling sun light (303) into the waveguide layer, and
at least one outcoupling element (304) configured for outcoupling light from the waveguide layer into a light transport channel (801) of the daylight illumination system.

14. A light collector according to embodiment 13, wherein the light collector is constructed in the form of a prefabricated facade element, and wherein the waveguide layer is a light guide plate.

15. A light collector according to embodiment 13 or 14, which is a static collector and has flat dimensions.

16. A light collector according to any of embodiments 13 to 15, wherein the light collection and redirection element (302) is embodied as a plurality of grating couplers and/or holograms and/or mirrors and/or micromirrors and/or reflective microstructures.

17. A light collector according to any of embodiments 13 to 16, wherein the light collector comprises a plurality of stacked waveguide layers (900).

18. A light collector according to any of the embodiments 13 to 17, wherein edges of the waveguide layer comprise an attached mirror (306, 406, 904) configured for redirecting light travelling within the waveguide layer towards the edges back towards at least one center or a channel attachment section (308) of the light collector.

19. A Light collector according to any of the embodiments 13 to 18, wherein the outcoupling element (304) is chosen from the group comprising flat mirror containing elements, parabolic mirror containing elements, elements containing optical light extraction structures at the surface such as e.g. prisms, pyramids, cones, or any combination thereof, or wherein the outcoupling element is provided by a bent waveguide layer (603) to redirect the light by total internal reflection within the waveguide layer.

20. A light collector according to any of the embodiments 13 to 19, wherein the light collector comprises a transparent front panel and a transparent back panel, and wherein the front and back panel are embodied as a glass panel, or a plastic panel such as a polymethylmethacrylate panel, a polyacrylate panel, a polycarbonate panel, or any combination thereof.

21. A light collector according to any of the embodiments 13 to 20, wherein the light collector comprises at least one coating or film laminated to it to control its reflection and transmission properties.

22. A light collector according to any of the embodiments 13 to 21, wherein the light collector comprises a cover glass, a PMMA layer as waveguide layer, high refractive index layer or a gradient refractive index layer, a prism film with mirror coating, a PET substrate and a back glass.

23. A daylight illumination system for integration into a building, the daylight illumination system comprising a light collector (800) according to any of the embodiments 13 to 22, a light transport channel (801) for guiding light from an outside of the building to an interior of the building,
wherein the outcoupling element (304) of the light collector is configured for directing light from the waveguide into the light transport channel,
wherein the light transport channel (801) comprises walls providing total reflection of the light, and wherein the light transport channel comprises at least one light distribution element (807) at which the guided light is allowed to leave the channel into the interior of the building.

24. A daylight illumination system according to embodiment 23, wherein the light collector is configured for collecting light from an area that is larger than the cross-section area of the light transport channel.

25. A daylight illumination system according to any of the embodiments 23 to 24, wherein the waveguide layer is a solid light guide, and wherein the light transport channel is a mirror-lined duct.

26. A building comprising a daylight illumination system according to any of embodiments 23 to 25, and an envelope with a facade in which the light collector is integrated as facade element.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. A single processor or other unit may fulfil the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems.

Any reference signs in the claims should not be construed as limiting the scope of the claims.

Abbreviations Used in the Specification or Claims

PMMA the acrylic polymer Polymethylmethacrylate
PET the polyester Polyethyleneterephthalate
PVB the polymer Polyvinylbutyral
LED light emitting diode Example 1: Average Light Flux (Office Hours) at Varying Latitudes Average light flux at the rear end (l=11 m) of south facing horizontal light channels, each of h=0.3 m and w=0.9 m, during standard office hours between 8 am and 5 pm is calculated for sky conditions found in Frankfurt a.M. (35% sunshine hours), Madrid and Abu Dhabi (based on public climate data: https://energyplus.net/weather) and light channel designs as described below.

Channel 1 comprises a front element comprising a light redirecting film (FIG. 1, 1st embodiment of the invention; film prepared as described in the example of WO 20141024146, FIGS. 5a-5h, but omitting second components described therein. The encapsulated mirrors are curved and have a width of 250 micrometer and repeat with a periodicity of 100 micrometer. The curvature is progressive as to better redirect light horizontally, the mirrors are modeled with a reflectance of 95%. The total film thickness is 300 micrometer. The film is laminated to the inner face of the outer glazing (4 mm) of a double glazing unit (4-12-4) covering the full surface of the vertical opening of the light tube facing the exterior.

Channel 2 comprises a front element comprising a light redirecting film and a collector. The redirecting film is similar to the one used in channel 1 with an extra adaptation of the mirror curvature in the bottom part and no mirrors in the upper 14 cm. The collector parts replace the inner glass pane of the double glazing. The area above and below the tube opening the collector is composed of a thick transparent plate which is curved and where the horizontal part ends with a wedge. The vertical part is 9 cm high, 3 cm thick, structured on its back side and the structures are coated with a reflective material. The structures are prismatic structures with the facets facing the tube opening tilted at 41° from the vertical and the other facets at 19° from the vertical. The wedge angle is 26°. The horizontal facet of the wedge is coated with a reflective material to outcouple light only on the tube side. The front element has a total height h=0.48 m (FIG. 2, 2nd embodiment of the invention)

Channel 3 comprises a front element identical to the one described in channel 1 with further adaptation of the mirror curvatures. This element is composed of a light redirecting film laminated to the inner face of the outer glass pane in a double glazing. The total height of the front element is 0.6 m, double the height of the final tube height after 11 m (0.3 m). Therefor the tube height changes within the first meters. The tube height is reduced to it final height on 1.41 m, the slanted face of the tube is flat and forms an angle of 12° with the horizontal.

Channel 4 is similar to channel 1 but the material used to encapsulate the mirrors is different from the one used for the structures and the curvature has been optimized to reach a more horizontal redirection of light. The difference in refractive index in this embodiment is subtle (0.02) but it increases the redirecting performance by some percent.

Channel 5 is like channel 1 but the light redirecting element is based on refractive properties of materials and does not contain a metallic reflector. To achieve light redirection, this system uses total internal reflection and therefore the change in refractive index. The system is composed of three different materials. The structure layer on the right has a standard refractive index of (n=1.5), it is then coated with a low refractive index material (n=1.4) and finally encapsulated with a third material (n=1.4).

Channel 6 is like channel 1 but the redirecting foil is replaced by a commercial product (3M Daylight Redirecting Film). Such a foil uses the refractive index difference between air and the structured polymer foil. The changing curvature increases the angular rang for which light is redirected in the right direction. Based on the profile of this commercial products, the optical properties are simulated.

Channel 7 is like channel 1 but the redirecting foil is replaced by a foil as described in Patent US 20020159154 A1 FIG. 2. Such a foil uses the refractive index difference between air and the polymer foil. The interfaces to the encapsulated air act like mirrors and reflect light deep into the light duct. For the application in light ducts, the design was optimized to maximize light flux at the end of the duct. The air gaps are 100 micrometer wide, 3 micrometer thick, 45 micrometer spaced and tilted by 10° to flatten the angle at which light from the sky is redirected into the tube.

For the purpose of comparison, light flux of another channel is calculated, which covers a glass front plate without any light redirecting element (reference).

For the simulation, a raytracing tool (LightTools 8.5, Synopsis' Optical Solutions Group, Pasadena, US) is used to characterize the system, in all cases assuming a reflectivity of 97% over all incidence angles for the light tube. The system transmittance is characterized for each incoming angle of the hemisphere with a resolution of 1° in elevation and 2° in azimuth. The transmittance is calculated between the front end of the duct and the rear end of the duct. This transmittance vector is then multiplied by the available luminance and solid angle for each direction at each time step. The sky luminance for each direction and over the whole year is computed based on the Perez model using the direct and diffuse irradiance from the hourly climatic data. Both the luminance for the sky and the ground (albedo of 30%) are considered. Hereby, the hourly light flux at the end of the system is computed.

Table 1 compiles results (in lumen) for the average light flux during office hours (Average) and for the minimum light flux during 50% of office hours (Minimum, i.e. during 50% of working hours, the light flux at the end of the duct will be equal to or higher than the given value) after 11 m transport length. The values are computed for the result obtainable using two identical light tubes. The average light flux is computed during said workhours. The minimum light flux is the minimum value reached when considering the best half of occupied hours. This value can be used to derive the minimum desk illuminance reached during 50% of occupied hours.

TABLE 1

Average light flux (lm) and minimum light flux (lm) after 11 m transport length by 2 light tubes

| Channel | | Frankfurt | Madrid | Abu Dhabi |
| --- | --- | --- | --- | --- |
| Reference | Average | 4300 | 5900 | 6000 |
| Reference | Minimum | 3450 | 5050 | 4850 |
| Channel 1 | Average | 5350 | 7650 | 7850 |
| Channel 1 | Minimum | 3750 | 6450 | 5650 |
| Channel 2 | Average | 5450 | 7800 | 8100 |
| Channel 2 | Minimum | 3800 | 6550 | 5700 |
| Channel 3 | Average | 7550 | 10300 | 11500 |
| Channel 3 | Minimum | 4650 | 6950 | 5850 |
| Channel 4 | Average | 5700 | 7950 | 8300 |
| Channel 4 | Minimum | 3900 | 6500 | 5650 |
| Channel 5 | Average | 4878 | 6836 | 7674 |
| Channel 5 | Minimum | 3516 | 5976 | 5518 |
| Channel 6 | Average | 5100 | 7450 | 7900 |
| Channel 6 | Minimum | 3400 | 6000 | 5250 |
| Channel 7 | Average | 5490 | 7724 | 9632 |
| Channel 7 | Minimum | 3848 | 6594 | 5728 |

The above results are validated by measurements with 1:10 reduced scale prototypes of each channel.

The daylighting system of the invention provides a surprisingly high light intensity.

Example 2: Full Scale Prototype

In order to further validate the simulation results of example 1, a 1:1 prototype is built. The prototype consists of two offices and two light tubes. Both offices are windowless and illuminated by one opening in each tube, they are 2.8 m wide and 3 m long with a ceiling at 2.6 m. The rooms (see FIGS. 14a and 14b) are painted white and furnished with a table and chairs. The tubes both have a rectangular cross section with interior dimension of 29 cm height and 87 cm width. The tubes are both 11.39 m long in total and placed in parallel with some space between them. One is fitted with a 3M DF200MA reflective foil and one with a Alanod Miro Silver DL reflective metal foil. All four openings in the bottom surface of the 2 tubes providing light to the rooms are offset by 14.5 cm with respect to the ceiling. The 14.5 cm distance between the room ceiling and the tube opening in each case is fitted with a reflective foil. The opening of each tube into the first room (FIG. 14b) is 30×80 cm, starting at 8 m from the façade, and in the second office (FIG. 14a) 29×83 cm and located at 11.1 m from the façade, at the very end of the tube (short length of the opening in direction of the tube length). The tube is ending with a quarter circle shaped reflector above the opening at the end of the tube, with a radius of 29 cm (see FIG. 15). Above the first opening, a reflective sheet is placed with an angle of 29° from the horizontal and a length of 27.8 cm to capture light from the tube and redirect it. The vertical openings on the front, façade side, are fitted with a simple plexiglass and then with a double glazing (4-12-4) integrating the 3M Daylight Redirecting Film redirecting foil. Field measurements are performed in Austria with façade facing south. Photos of the 1$^{st}$ room taken at fixed times on Sep. 26, 2017, are evaluated to quantify the light intensity on the workplace; results are shown in Table 2.

TABLE 2

Illuminance on the office desk in the front room, illuminaires 8 m from façade, derived from the illuminance. Measurement performed on Sep. 26, 2017 with the 3M Daylight Redirecting Film light redirecting foil at the façade.

| Time of day | 10:00 | 11:00 | 12:00 | 13:00 | 14:00 |
|---|---|---|---|---|---|
| Illuminance (lux) | 343 | 902 | 1139 | 614 | 892 |

Illuminance values up to 1700 lux are detected at other times in the same office with a lux meter placed on the desk.

The invention claimed is:

1. Daylight illumination system for integration into a building or a vehicle, the daylight illumination system comprising
a translucent façade element (800) or wall element containing a glass sheet and a light redirection element (302 or 708), and a light transport channel (801) for guiding light about horizontally into an interior of the building or vehicle, the light transport channel comprising one opening attached to the interior side of said facade element or wall element and at least one opening towards the interior of the building or vehicle, characterised in that
the light redirection element (302 or 708) is formed as a structured polymer film or sheet attached to a glass sheet of the facade element (800) or wall element and is configured for changing the direction of incident light into the about horizontal light transport channel, and the light transport channel containing an air or gas filling being sealed against the ambient atmosphere.

2. Daylight illumination system of claim 1 for integration into a building, the daylight illumination system comprising
a translucent facade element (800) containing a glass sheet and a light redirection element (302 or 708), and a light transport channel (801) for guiding light about horizontally into an interior of the building, the light transport channel comprising one opening attached to the interior side of said facade element and at least one opening towards the interior of the building, characterised in that
the light redirection element (302 or 708) is formed as a structured polymer film or sheet attached to a glass sheet of the facade element (800) and is configured for changing the direction of incident light into the about horizontal light transport channel.

3. Daylight illumination system according to claim 2, wherein the translucent facade element (800) comprises an insulating glazing unit containing at least 2 parallel glass sheets and at least one polymer film, wherein the total thickness of the facade element (800) is from the range 10 to 1000 mm.

4. Daylight illumination system according to claim 2, wherein the translucent facade element (800) comprises at least 2 parallel glass sheets, and the light redirection element (302) is attached to the interior surface of the glass sheet suitable for forming a section of the outer surface of the building envelope.

5. Daylight illumination system according to claim 2, wherein the translucent facade element (800) comprises a light collector (100, 200, 700, 800), the light collector comprising at least one waveguide layer (301),
at least one light collection and redirection element (302) which is configured for coupling sun light (303) into the waveguide layer, and
at least one outcoupling element (304) configured for outcoupling light from the waveguide layer into a light transport channel (801) of the daylight illumination system.

6. Daylight illumination system of claim 1, wherein the light transport channel comprises at least one opening towards the interior of the building or vehicle equipped with a light distribution element (807) allowing the guided light to leave the channel into the interior of the building or vehicle.

7. Daylight illumination system of claim 1, wherein the openings of the light transport channel for light entry and for a light distribution element (807) are arranged about rectangularly to each other, the light channel preferably being suitable for mounting with the opening for light entry, and attached facade element (800) or wall element with light redirection element (302), about vertically, and the opening for light distribution element (807) about horizontally.

8. Daylight illumination system of claim 1, wherein the light guiding inner walls of the light transport channel (801) are covered by a reflective layer.

9. Daylight illumination system according to claim 1, wherein the cross section of the light transport channel (801) has a height from the range 8 to 50; has a width from the range 20 to 300 cm and the length of the light transport channel (801) is from the range 500 to 2000 cm.

10. Daylight illumination system according to claim 1, wherein the light redirection element (302 or 708) is embodied as a plurality of grating couplers and/or holograms and/or mirrors and/or micromirrors and/or reflective micro structures.

11. Daylight illumination system according to claim 1, wherein the light redirection element (302 or 708) comprises a metal and/or a material of low refractive index such as air, each embedded in a polymer film.

12. Daylight illumination system according to claim 1 further comprising an artificial light source.

13. Daylight illumination system according to claim 1 comprising a light transport channel, whose cross section narrows down by a factor 1.2 to 5 over a distance of up to 2 m from its front opening.

14. Daylight illumination system according to claim 1 comprising glass sheet, light redirection element and light transport channel essentially as depicted in FIG. 1, 8, 11 or 13.

15. Building or vehicle comprising
    a daylight illumination system according to claim 1, and
    an envelope with a facade or outside wall in which the light redirection element is integrated in a translucent facade element or wall element or window.

16. Method for improving the light quality in a building or vehicle by increasing the amount of daylight brought into the building or vehicle, characterized in mounting a daylight illumination system according to claim 1 to the building or vehicle to integrate the system into the building envelope or vehicle wall, with the light transport channel of the system aligned about horizontally away from the building's façade or outside wall of the vehicle.

17. Daylight illumination system of claim 1 wherein the light transport channel has an inside surface which has a mirrored lining to reflect the light, and the mirror lining being interrupted by luminaire sections whereby the light may leave the light transport channel in the sections.

* * * * *

UNITED STATES PATENT AND TRADEMARK OFFICE
CERTIFICATE OF CORRECTION

| | | |
|---|---|---|
| PATENT NO. | : 11,209,142 B2 | Page 1 of 1 |
| APPLICATION NO. | : 16/897573 | |
| DATED | : December 28, 2021 | |
| INVENTOR(S) | : Hintermann et al. | |

It is certified that error appears in the above-identified patent and that said Letters Patent is hereby corrected as shown below:

On the Title Page

Item (73), should read as follows:
(73) Assignees: Skynative UG, Basel (CH) Speyer (DE)

Signed and Sealed this
Fourth Day of March, 2025

Coke Morgan Stewart
*Acting Director of the United States Patent and Trademark Office*